US010986400B2

(12) United States Patent
Hua et al.

(10) Patent No.: US 10,986,400 B2
(45) Date of Patent: Apr. 20, 2021

(54) COMPACT VIDEO REPRESENTATION FOR VIDEO EVENT RETRIEVAL AND RECOGNITION

(71) Applicant: Microsoft Technology Licensing, LLC, Redmond, WA (US)

(72) Inventors: Gang Hua, Sammamish, WA (US); Dongqing Zhang, Beijing (CN); Zhanning Gao, Beijing (CN)

(73) Assignee: Microsoft Technology Licensing. LLC, Redmond, WA (US)

( * ) Notice: Subject to any disclaimer, the term of this patent is extended or adjusted under 35 U.S.C. 154(b) by 624 days.

(21) Appl. No.: 15/228,827

(22) Filed: Aug. 4, 2016

(65) Prior Publication Data

US 2018/0041765 A1 Feb. 8, 2018

(51) Int. Cl.
| | |
|---|---|
| *H04N 19/25* | (2014.01) |
| *H04N 21/44* | (2011.01) |
| *H04N 21/234* | (2011.01) |
| *G06K 9/00* | (2006.01) |
| *H04N 21/482* | (2011.01) |

(52) U.S. Cl.
CPC ... *H04N 21/44008* (2013.01); *G06K 9/00744* (2013.01); *H04N 21/23418* (2013.01); *H04N 21/4828* (2013.01)

(58) Field of Classification Search
CPC ......... G06K 9/00751; H04N 21/23418; H04N 21/44008
See application file for complete search history.

(56) References Cited

U.S. PATENT DOCUMENTS

| 8,805,123 B2 | 8/2014 | Shirron et al. | |
|---|---|---|---|
| 2013/0282747 A1 | 10/2013 | Cheng et al. | |
| 2014/0250376 A1* | 9/2014 | Jojic | G06F 16/34 715/273 |

(Continued)

FOREIGN PATENT DOCUMENTS

| CN | 101281520 B | 4/2010 |
|---|---|---|
| CN | 104683765 A | 6/2015 |

OTHER PUBLICATIONS

Gao et al., "Counting Grid Aggregation for Event Retrieval and Recognition," In Proceedings of Computer Science—Computer Vision and Pattern Recognition, Apr. 2016, pp. 1-10 (Year: 2016).*

(Continued)

*Primary Examiner* — Dave Czekaj
*Assistant Examiner* — Berteau Joisil
(74) *Attorney, Agent, or Firm* — Schwegman Lundberg & Woessner, P.A.

(57) ABSTRACT

Comprehensive, compact, and discriminative representations of videos can be obtained using a counting grid representation of the video and aggregating features associated with active locations of the counting grid to obtain a feature representation of the video. The feature representation can be used for video retrieval and/or recognition. In some examples, the techniques may include conducting normalization and dimension reduction on the aggregated features to obtain a further compact and discriminative feature representation. In some examples, the counting grid representation of the video is generated using a pre-trained counting grid model in order to provide spatially consistent feature representations of the videos.

20 Claims, 13 Drawing Sheets

News Anchor Scene 206

(56) References Cited

U.S. PATENT DOCUMENTS

| | | |
|---|---|---|
| 2014/0301661 A1 | 10/2014 | Voronov et al. |
| 2015/0222919 A1 | 8/2015 | Licata |
| 2016/0063103 A1 | 3/2016 | Bostick et al. |

OTHER PUBLICATIONS

Amer et al. (Conference Paper in Proceedings / CVPR, IEEE Computer Society Conference on Computer Vision and Pattern Recognition. IEEE Computer Society Conference on Computer Vision and Pattern Recognition • Jun. 2012:"Sum-Product Networks for Modeling Activities with Stochastic Structure" (Year: 2012).*

Althoff et al, "Detection Bank: An Object Detection Based Video Representation for Multimedia Event Recognition," In Proceedings of the 20th ACM international conference on Multimedia, Oct. 29, 2012, 4 pages.

Aly et al., "The AXES submissions at TrecVid 2013," In Proceedings of TREC Video Retrieval Evaluation, Nov. 2013, 12 pages.

Amer et al., "Sum Product Networks for Activity Recognition," In Proceedings of IEEE Transactions on Pattern Analysis and Machine Intelligence, vol. 38, No. 4, Aug. 7, 2015, pp. 1-14.

Babenko et al., "Aggregating Deep Convolutional Features for Image Retrieval," In Journal of Computing Research Repository, Oct. 2015, 9 pages.

Babenko et al., "Neural Codes for Image Retrieval," In Proceedings of 13th European Conference on Computer Vision, Sep. 6, 2014, pp. 1-16.

Baillie et al., "Audio-based Event Detection for Sports Video," In Proceedings of 2nd International Conference on Image and Video Retrieval, Jul. 24, 2003, 11 pages.

Douze et al., "Circulant temporal encoding for video retrieval and temporal alignment," In Journal of Computing Research Repository, Jun. 2015, pp. 1-15.

Douze et al., "Stable hyper-pooling and query expansion for event detection," In Proceedings of IEEE International Conference on Computer Vision, Dec. 2013, 9 pages.

Fan et al., "Liblinear: A library for Large Linear Classification," In Journal of Machine Learning Research, vol. 9, Aug. 2008, pp. 1871-1874.

Gan et al., "DevNet: A Deep Event Network for Multimedia Event Detection and Evidence Recounting," In Proceedings of IEEE Conference on Computer Vision and Pattern Recognition, Jun. 7, 2015, pp. 2568-2577.

Gao et al., "Counting Grid Aggregation for Event Retrieval and Recognition," In Proceedings of Computer Science—Computer Vision and Pattern Recognition, Apr. 2016, pp. 1-10.

Gong et ai., "Multi-scale orderless pooling of deep convolutional activation features," In Proceedings of 13th European Conference on Computer Vision, Sep. 6, 2014, 17 pages.

Jegou et al., "Aggregating local descriptors into a compact image representation," In Proceedings of IEEE Conference on Computer Vision and Pattern Recognition, Jun. 13, 2010, pp. 3304-3311.

Jegou et al., "Negative Evidences and Co-Occurrences in Image Retrieval: the Benefit of PCA and Whitening," In Proceedings of the 12th European conference on Computer vision, vol. Part II, Oct. 7, 2012, pp. 1-14.

Jegou et al., "Triangulation embedding and democratic aggregation for image search," In Proceedings of IEEE Conference on Computer Vision and Pattern Recognition, Jun. 2014, 13 pages.

Jiang et al., "Exploiting Feature and Class Relationships in Video Categorization with Regularized Deep Neural Networks," In Proceedings of the Computing Research Repository, Feb. 2015, pp. 1-22.

Jojic et al., "Multidimensional Counting Grids: Inferring Word Order from Disordered Bags of Words," In Proceedings of the Twenty-Seventh Conference on Uncertainty in Artificial Intelligence, Jul. 14, 2011, 10 pages.

Joly et al., "Robust Content-Based Video Copy Identification in a Large Reference Database," In Proceedings of Conference on Image and Video Retrieval, Jul. 24, 2003, 10 pages.

Karpenko et al., "Tiny Videos: A Large Data Set for Nonparametric Video Retrieval and Frame Classification," In Journal of IEEE Transactions on Pattern Analysis and Machine Intelligence, vol. 33, No. 3, Mar. 2011, pp. 618-630.

Krizhevsky et al., "Imagenet Classification with Deep Convolutional Neural Networks," In Proceedings of 26th Annual Conference on Neural Information Processing Systems, Dec. 3, 2012, pp. 1-9.

Lowe, "Distinctive Image Features from Scale-Invariant Keypoints," In International Journal of Computer Vision, vol. 60, Issue 2, Nov. 2004, pp. 1-28.

Mazloom et al., "Encoding Concept Prototypes for Video Event Detection and Summarization," In Proceedings of the 5th ACM on International Conference on Multimedia Retrieval, Jun. 23, 2015, pp. 123-130.

Over et al., "TRECVID 2014—An Overview of the Goals, Tasks, Data, Evaluation Mechanisms and Metrics," In Proceedings of TREC Video Retrieval Evaluation, Nov. 2014, pp. 1-52.

Perina et al., "Capturing Spatial Interdependence in Image Features: The Counting Grid, an Epitomic Representation for Bags of Features," In Journal of IEEE Transactions on Pattern Analysis and Machine Intelligence archive, vol. 37, Issue 12, Dec. 2015, pp. 2374-2387.

Perina et al., "Image Analysis by Counting on a Grid," In Proceedings of IEEE Conference on Computer Vision and Pattern Recognition, Jun. 20, 2011, pp. 1985-1992.

Perina et al., "Spring Lattice Counting Grids: Scene Recognition Using Deformable Positional Constraints," In Proceedings of the 12th European Conference on Computer Vision, Oct. 7, 2012, 14 pages.

Perronnin et al., "Fisher Vectors Meet Neural Networks: A Hybrid Classification Architecture," In Proceedings IEEE of Conference on Computer Vision and Pattern Recognition, Jun. 7, 2015, pp. 3743-3752.

Perronnin et al., "Improving the fisher kernel for large-scale image classification," In Proceedings of the 11th European conference on Computer vision, Part IV, Sep. 5, 2010, pp. 143-156.

Ramanathan et al., "Learning Temporal Embeddings for Complex Video Analysis," In Proceedings of IEEE International Conference on Computer Vision, Dec. 2015, pp. 4471-4479.

Razavian et al., "CNN Features off-the-shelf: an Astounding Baseline for Recognition," In Proceedings of IEEE Conference on Computer Vision and Pattern Recognition, Jun. 23, 2015, 8 pages.

Revaud et al., "Event retrieval in large video collections with circulant temporal encoding," In Proceedings of IEEE Conference on Computer Vision and Pattern Recognition, Jun. 23, 2013, 9 pages.

Sanchez et al., "Image Classification with the Fisher Vector: Theory and Practice," In International Journal Computer of Vision, vol. 105, Issue 3, Jun. 12, 2013, pp. 222-245.

Wang et al., "Action Recognition with Improved Trajectories," In Proceedings of IEEE International Conference on Computer Vision, Dec. 2013, pp. 3551-3558.

Xu et al., "A Discriminative CNN Video Representation for Event Detection," In Proceedings of IEEE Conference on Computer Vision and Pattern Recognition, Jun. 2015, pp. 1798-1807.

Ying, "Summarization from Multiple User Generated Videos in Geo-Space," In Ph.D. Thesis of National University of Singapore, Jul. 2014, 202 pages.

Zhou et al., "SIFT-Bag Kernel for Video Event Analysis," In Proceedings of the 16th International Conference on Multimedia, Oct. 26, 2008, pp. 229-238.

Zhu et al., "A Novel Audio Fingerprinting Method Robust to Time Scale Modification and Pitch Shifting," In Proceeding of the 18th ACM international conference on Multimedia, Oct. 25, 2010, pp. 987-990s.

* cited by examiner

COMPACT VIDEO REPRESENTATION FOR VIDEO EVENT RETRIEVAL AND RECOGNITION

BACKGROUND

As video capture technology has proliferated and as the corpus of videos accessible by consumers has exponentially grown, solutions for sifting through and identifying particular data in videos have emerged. The vast majority of these solutions have relied on appearance-based methods, often at the frame level. However, these solutions have been plagued by various shortcomings. For example, some former solutions process videos to derive a list of features of the videos for key frames of the video, but the list of features is of a variable length (e.g., often in the thousands or tens of thousands), which causes issues with storage, processing, and consistency. Also, these solutions tend to be inaccurate, especially when scenes in the video change slowly and smoothly. These solutions also tend to overweight frequently appearing scenes so that even if a particular scene is important to the whole of the video, if the number of frames attributable to the scene are few, the existing solutions tend not to identify the particular scene as being important. Other solutions include hand-crafted pooling of frame-level features into video-level features. These solutions tend to work under certain conductions, but tend to not generalize well. Yet other solutions use generic feature coding methods, such as fisher vector coding based on local features. These solutions are also hampered by storage, processing, and consistency since they result in feature lists of a high dimension (e.g., tens of thousands of features).

Thus, existing solutions for representing the contents of videos and/or retrieving videos based on particular content of interest tend to be onerous and/or fraught with inaccuracy.

SUMMARY

This summary is provided to introduce simplified concepts relating to a compact representation for video event retrieval and recognition. This summary is not intended to identify essential features of the claimed subject matter, nor is it intended for use in determining the scope of the claimed subject matter.

The techniques for compact representation of video event and/or video retrieval and/or video recognition described herein distinguish between distinct events in videos, represent videos in a consistent manner, and use consistent amounts of and less space while suppressing the influence long or repetitive shots. In some example, the techniques generate a counting grid representation of a video and aggregate features associated with active locations of the counting grid to obtain a feature representation of the video. In some examples, the techniques further include conducting normalization and dimension reduction on the aggregated features. In some examples, the counting grid representation of the video is generated using a pre-trained counting grid model in order to provide spatially consistent feature representations of the videos.

The techniques can also provide spatially consistent feature representations of videos, meaning that frames with similar features are placed in similar areas of the counting grid. Accordingly, the representations of different videos can be more consistently represented. This can allow the representation of the video to be more readily understood without the need for additional metadata about the representation.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
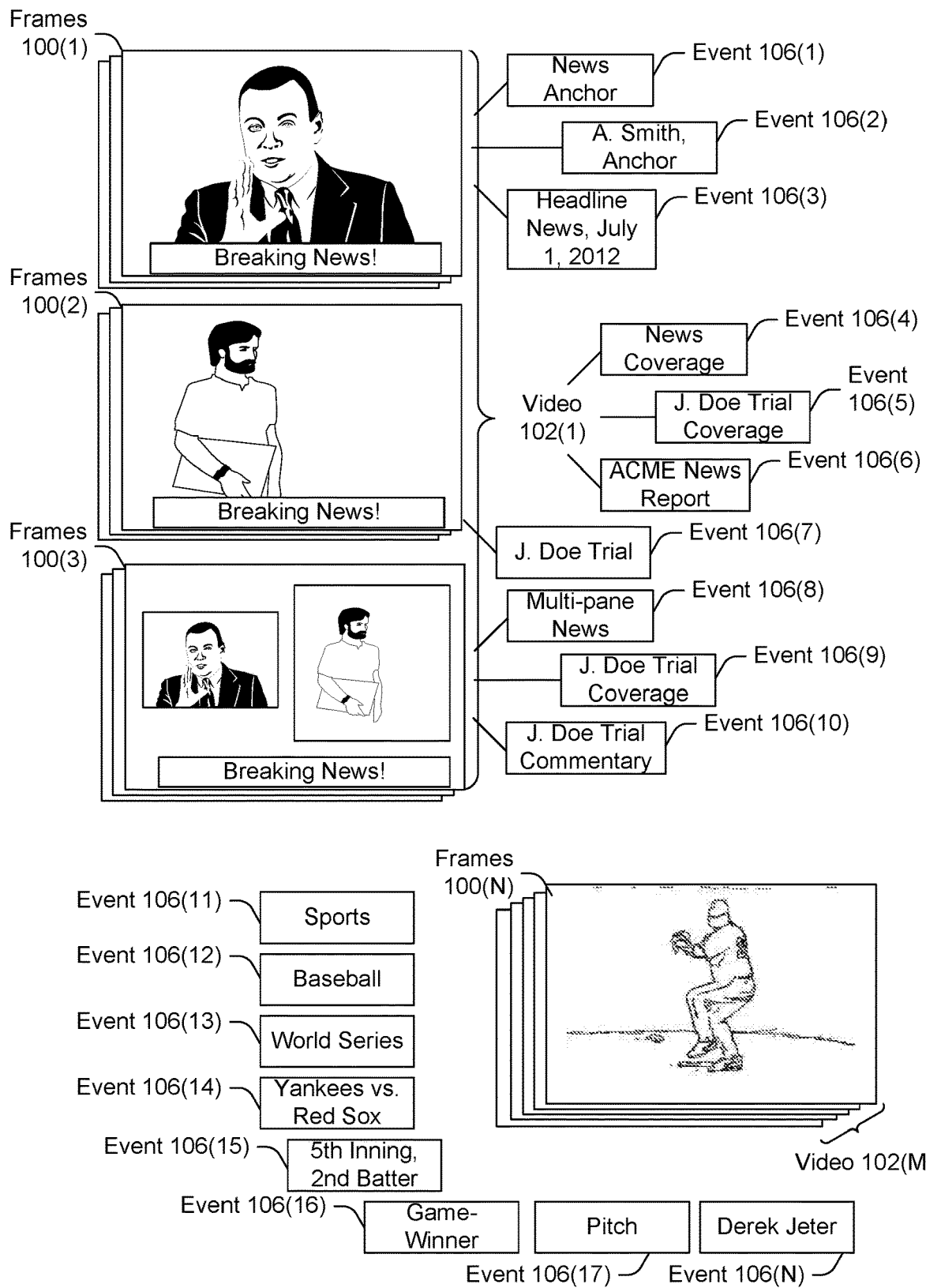
FIG. 1 is a block diagram depicting an example scenario for which the techniques can operate to obtain a video representation having the attributes discussed herein such as, for example, compactness, discrimination, comprehensiveness, and/or spatial consistency.

This disclosure is directed to techniques to provide comprehensive, compact, and discriminative representations of videos for video event retrieval and/or video event recognition. The techniques described herein can generate a counting grid representation of a video and aggregate features associated with active locations of the generated counting grid to obtain a feature representation of the video. In some examples, the techniques can further include normalization and dimension reduction on the aggregated features to obtain a final feature representation. Normalization and/or dimension reduction can decrease retrieval times and can further improve recognition of distinct events. In some examples, the counting grid representation of the video is generated using a pre-trained counting grid model in order to provide spatially consistent feature representations of the videos. That is, video representations for videos that are similar will themselves be similar. Equivalently, in some examples, features of videos that are similar can be mapped to nearby locations in the counting grid. In some examples, the techniques described herein are unsupervised. In some examples, the techniques described herein can be more memory-efficient and/or outperform existing methods in terms of retrieval and recognition accuracy and/or speed.

The techniques provide spatially consistent feature representations of videos, meaning that frames with similar features can be placed in nearby areas of the counting grid. Accordingly, the final representations of different videos can be more consistently represented. Thus, in some examples, the representations of the videos can be readily understood without additional metadata about feature representations for the videos. In some examples, the techniques provide consistent counting grid arrangements by initializing generation of a counting grid for a video from a pre-trained counting grid model that has been trained on a corpus of video data.

In order for a user to conveniently search or recognize a video event from a corpus of videos, the techniques discussed herein provide a comprehensive, compact, and yet discriminative representation of videos. In some examples, the video representation produced by the techniques herein are comprehensive in that the techniques aggregate information across relevant video frames while suppressing redundant information. This stands in opposition to former solutions that form feature vectors from key frames and is more accurate than other solutions that would pool frame-level features to form video-level features. Former solutions that average across frame-level descriptors to form a video-level representation may undesirably over-weight information from long or recurrent shots of a video, which end up dominating the final representation, and neglect valuable temporal correlations between consecutive frames. This is why some solutions aggregate over key frames, but these solutions tend to only work on videos with distinct changes between shots and the size of the representations vary with the number of key frames, making storage, retrieval, and matching difficult. In contrast, the techniques discussed herein distinguish between distinct events regardless of scene characteristics and they reduce the effect of long or redundant shots.

In some examples, the video representations produced by the techniques described herein are compact in that they are efficient, in terms of memory usage required to store them, the speed with which they can be retrieved, and the speed with which a user can recognize relevant portions of the videos. The video representation produced by these techniques can have dimensions on the order of ten to a hundred times smaller than other solutions (e.g., existing solutions discussed above). Moreover, the video representations produced by the techniques discussed herein can have a fixed size (e.g., a fixed number of dimensions corresponding to features, a fixed number of frames), making matching and retrieval easier.

Furthermore, in some examples, the techniques discussed herein are discriminative in that the techniques effectively differentiate disparate events, resulting in representations that accurately differentiate these events, even though the techniques discussed herein produce final feature representations with dimensions ten to a hundred orders smaller than other solutions' final feature representations.

As used herein, a video "event" can refer to events of different granularities. For example, an "event" can refer to a video (e.g., Sep. 11, 2001 news, Super Bowl XXXII, President Obama's State of the Union Address, 2014); a scene of a video (e.g., a half-time show, a hockey period, a battle scene, a talk show report on a particular topic); an occurrence within a video (e.g., a slam dunk in a basketball game, a person making a particular statement); a genre of a video or a portion of a video; or portion of a video having a desired quality (e.g., portions a particular subject such as an animal or person appear in, portions containing a place or a type of geography, a portion having certain video qualities such as color).

In some examples, the video representations can be used to facilitate video recognition. For example, the video representations can be, or can be used to generate, an abbreviated form of the video, such as, for example, video stills having features corresponding to various events of the video or a desired event of the video, or a video comprised of a defined length of segments (e.g., 3 seconds) of frames having features corresponding to one or more events. In some examples, the video representations can be used for video retrieval or video portion retrieval. For example, the video representation can include descriptors that a query system can use to facilitate responding to a query for videos having descriptors or an event associated therewith (e.g., an event can be associated with a sub-set of descriptors).

The terms "descriptor" and "feature" are used interchangeably herein. A feature or a descriptor, as used herein, are a distinctive attribute or aspect of an image and/or video and/or an element or term that has the function of describing or identifying such an attribute. In some examples, a descriptor/feature can include visual primitives and/or terms or elements that correspond to the visual primitive.

The term "techniques" can refer to system(s), method(s), computer-readable media encoded with instructions, module(s), and/or algorithms, as well as hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), etc. as permitted by the context described above and throughout the document.

FIG. 1 is a block diagram depicting example frames 100(1)-(M) of example videos 102(1) and 102(N) and example events 106(1)-106(N) that could be associated with one or more frames of the videos 102(1) and 102(N), respectively. In this example, video 102(1) is news coverage of a court case and video 102(N) is a video of a baseball game. In some examples, the techniques can be used to obtain a feature representation of a video, which can be used to associate one or more events with a video or a portion of the video. In some examples, the feature representation can itself include an event. In some examples, events can be associated with a subset of features of a feature representation. For example, a feature representation can include identifiers of visual primitives that appear in a frame. In some examples, a subset of the identifiers can be associated with a particular event (e.g., a certain subset of identifiers can be associated with the appearance of a particular person within a frame).

FIG. 1 includes a variety of example events 106(1)-(N) that could be associated with the videos 102(1) and 102(N) or portions thereof. In FIG. 1, events 106(1)-(3) and 106(7)-(10) are associated with frames 100(1)-(3), respectively, whereas events 106(4)-(6) are associated with the video 102(1) in its totality, including all of the frames 100(1)-(3). In some examples, events can be associated with individual frames, scenes, and/or entire videos. In some examples, an event can be assigned to non-consecutive frames and/or scenes (see FIG. 2A and FIG. 2B, for example). For example, the event 106(2), "A. Smith, Anchor," could refer to an event that refers to the appearance of a particular news anchor within frames of a video. The news anchor may appear in multiple non-consecutive frames of the video, however, as an editor may cut from shots of the news anchor to other shots such as the court room shots depicted by frames 100(2).

In some examples, the specificity and type of the subject matter events describe can vary. In some examples, general events (e.g., events 106(4), (11), (12), (16), (17)) can be derived from events of a finer granularity (e.g., events 106(4), (7), (13), (14), (15)) and/or from the feature representation of a video and vice versa. For example, the co-existence of the events "basketball," "court," "player," and "fans" can be used to form the event "basketball game." In some examples, descriptors of the events can include literal descriptions (e.g., events 106(4) and (12)) and/or abstract descriptions or characterizations (e.g., event 106 (16), "fast-paced", "game winner", "exciting"). In some examples, one or more of external information, the feature representation of the video, and/or event data can be used to derive events (e.g., using a date to derive event 106(3), a channel number to derive event 106(6), or audio information of the video to derive event 106(10)). In some examples, events can be associated one or more frames of a video. As used herein, a scene is a subset of frames of a video and a video refers to a discrete set of frames.

In some examples, the events can be used to facilitate retrieval of videos or portions of videos relevant to a search term. In such an example, the techniques can obtain a feature representation for a video using a counting grid, generate events related to the feature representation (e.g., by finding events associated with subsets of features of the feature representation), and make one or more of the feature representation, identifiers associating events with particular frame(s), and/or the event terms to a service that responds to search queries.

In some examples, the techniques can be used for event recognition. For example, the techniques can obtain a feature representation of the video using a counting grid and use the feature representation to generate an abbreviated form of the video that facilitates recognition of distinct events in the video. The techniques described herein facilitate generation of an abbreviated form such as, for example, a collection of individual frames and/or a collection of scenes of a video, wherein individual frames or individual scenes of the collection represent distinct events in the video.

In both the retrieval and the recognition examples, in some examples the techniques described herein utilize a counting grid model to aggregate frame-level features across a video to capture the interdependence of the frame features and to minimize the contribution of redundant information and to accurately identify distinct events in a video.

Example Input

FIG. 2A-FIG. 2D illustrate an example input video 200 (e.g., video 100(1)) comprising individual frames 202(1)-202(0). Example input video 200 contains three example scenes, court room scene 204 (depicted in FIG. 2A and represented by diagonal cross-hatching), news anchor scene 206 (depicted in FIG. 2B and represented by black scale), and dual-window scene 208 (depicted in FIG. 2C and represented by dotting). In some examples, the techniques can be used to segment these example scenes. In some examples, frames composing a scene can be frames assigned to a same location in the counting grid or assigned to locations within a specified distance of each other. As discussed below, frames assigned to a same or near location within the counting grid have the same or similar descriptors.

Figure 2A:
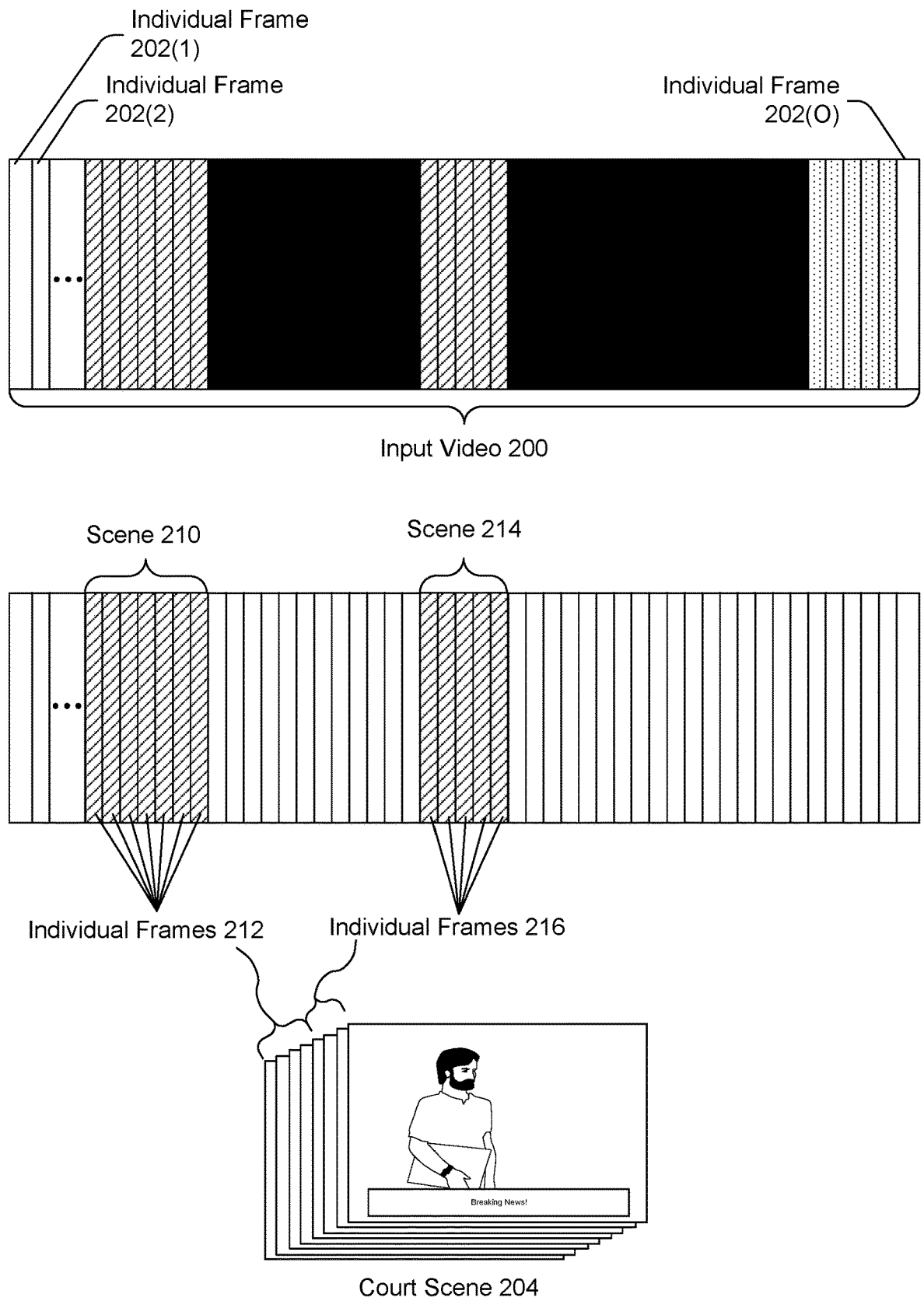
FIG. 2A-FIG. 2D are block diagrams depicting components of an example input video for which a compact video representation is to be obtained.
Figure 2B:
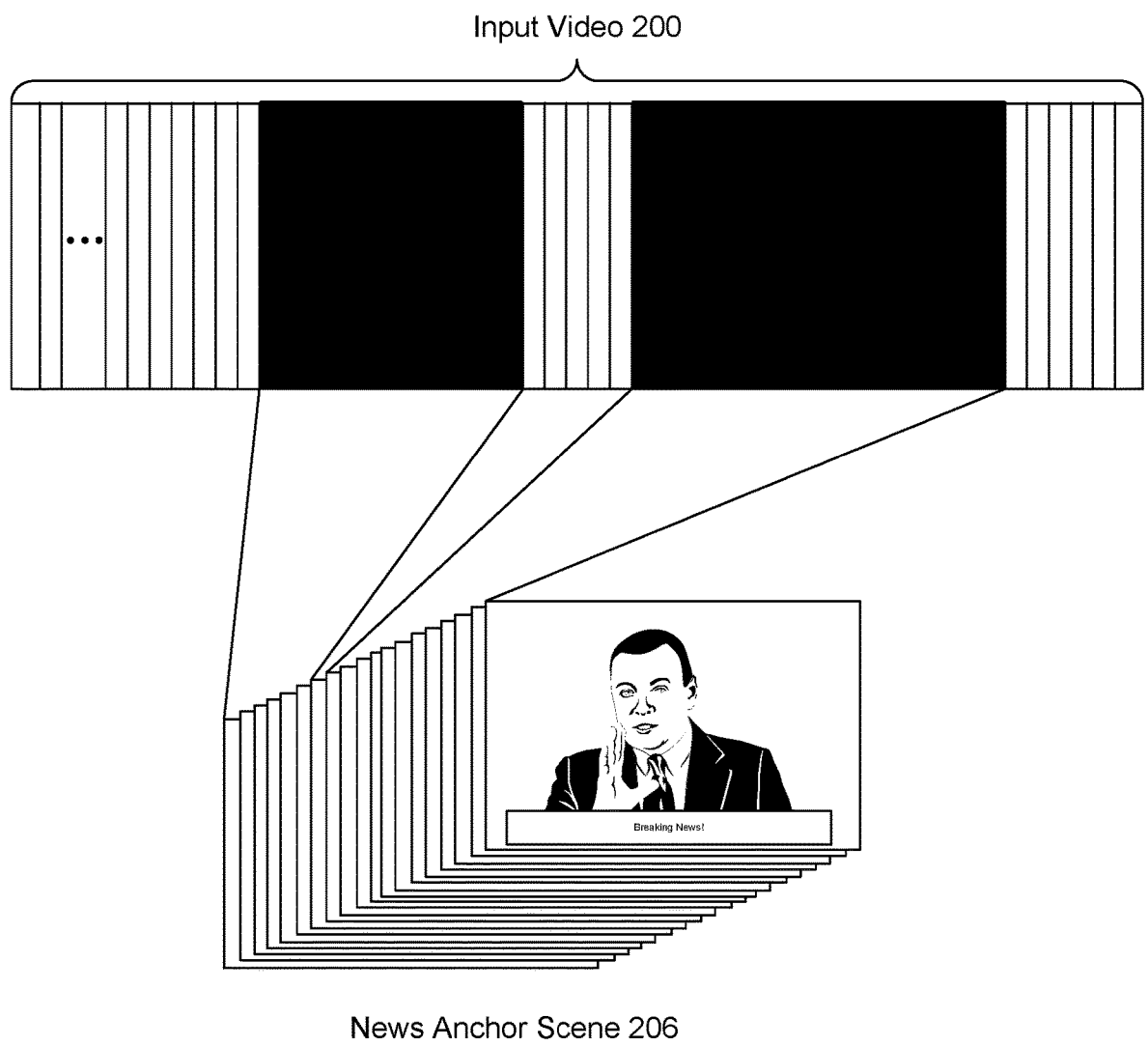
Figure 2C:
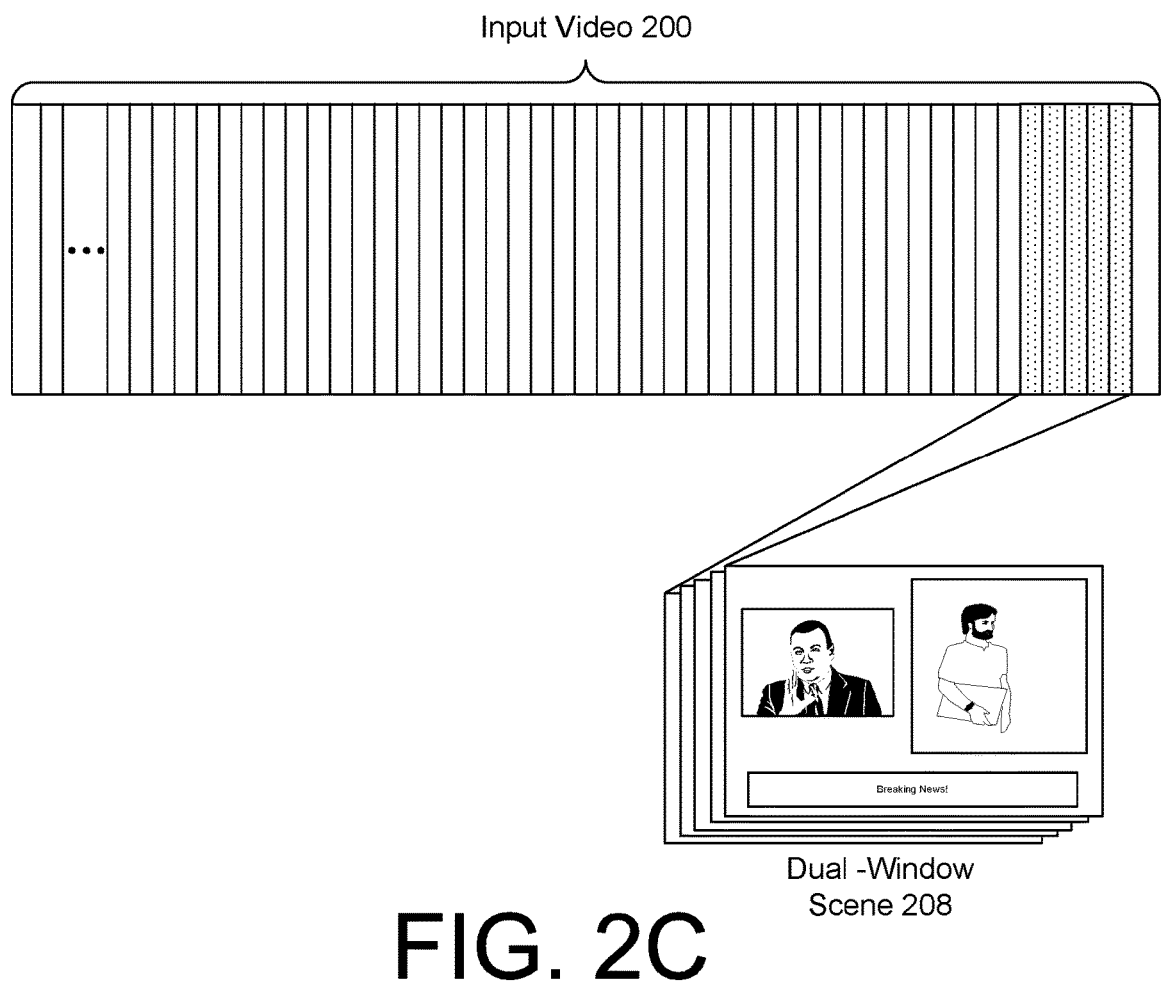

In this example, the court room scene 204 and the news anchor scene 206 include non-consecutive scenes, as FIG. 2A and FIG. 2B depict. For example, court room scene 204 includes scene 210, which comprises individual frames 212, and scene 214, which comprises individual frames 216. In some examples, abbreviated forms of a video can include one or more individual frames or scenes, and events can be associated with one or more of individual frames, scenes, or entire videos. In this example, an abbreviated form could include individual frames 212 and a subset of the individual frames making up the news anchor scene 206.

Figure 2D:
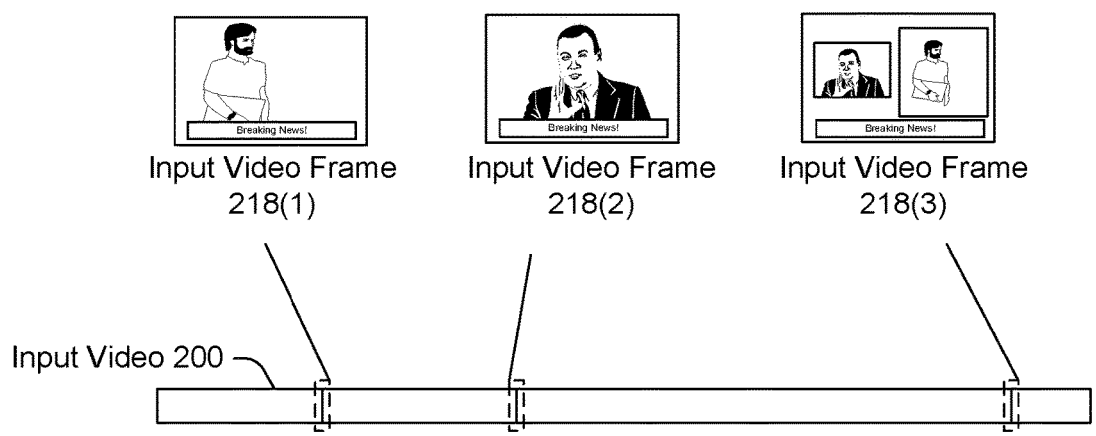

FIG. 2D depicts an alternate representation of example input video 200 and example individual input video frames ("IVF") 218(1), 218(2), and 218(3) located within example input video 200 for use in the discussion below. IVFs 218(1)-(3) can be frames of the example input video 200 at an index number location within the example input video 200 or at a time location within the example input video 200. In some examples, a "video" can comprise any stream of images, whether or not the images are contained within a same file. In other examples, a video can be a collection of frames contained in a same file and, in some examples, indexed by time, frame number, or some other method to order the frames.

Example Device

Figure 3:
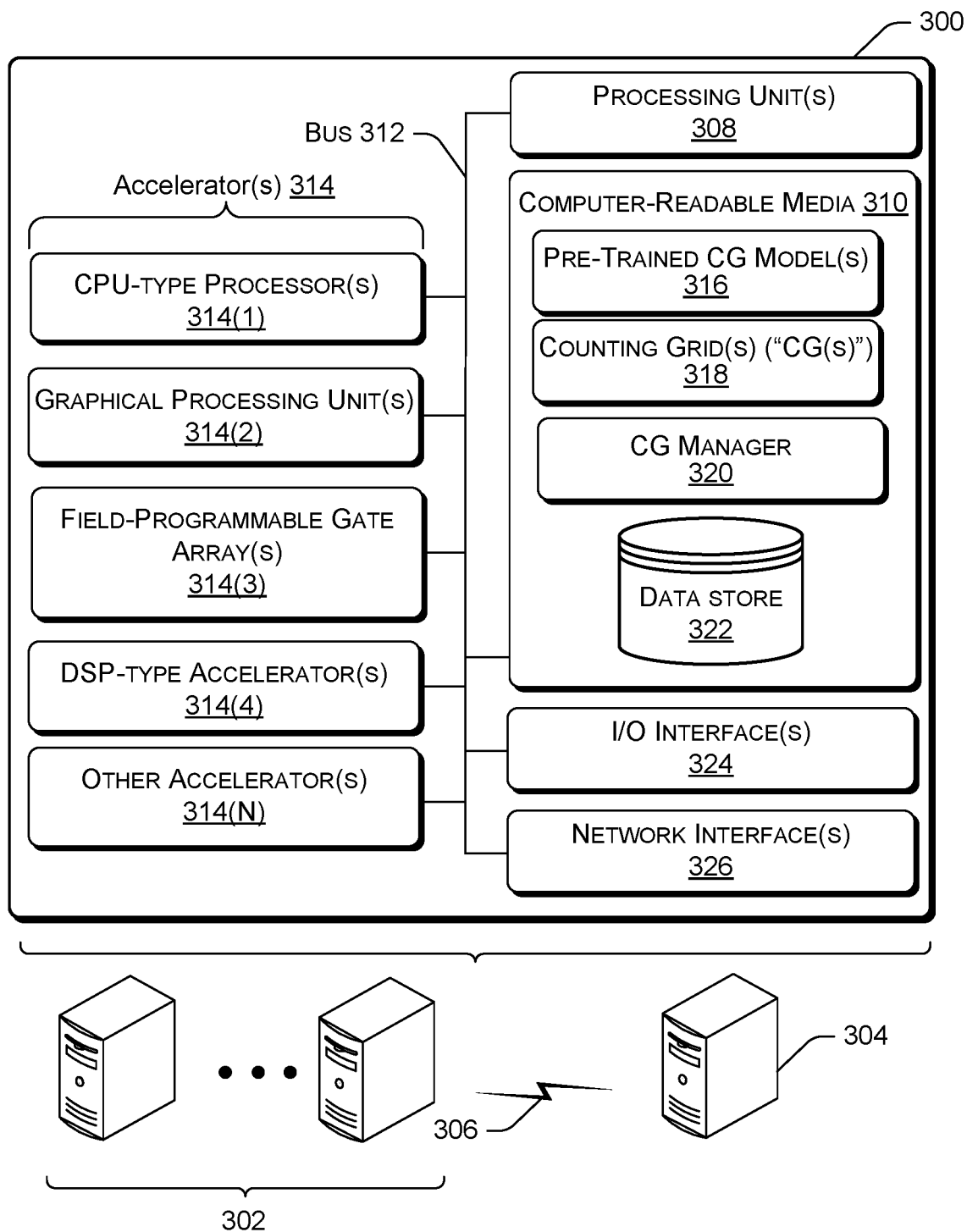
FIG. 3 is a block diagram of an example device configured to facilitate creation of video representations having the attributes discussed herein such as, for example, compactness, discrimination, comprehensiveness, and/or spatial consistency.

FIG. 3 is a block diagram depicting select components of an example device 300 configured to facilitate creation of video representations having any or all of the attributes discussed herein. The example device 300 can represent one or more distributed computing resources 302 and/or an individual computing device 304, and/or other computing devices implementing some or all of the techniques described herein. In some examples, the example device 300 can include distributed computing resources 302 that can communicate with one another and with external devices, such as individual computing device 304, via one or more networks 306. In at least one example, the distributed computing resources 302 can implement the techniques described herein independently or in parallel. In some examples, a individual computing device 304 can implement the entire techniques discussed herein. As such, either the distributed computing resources 302 and/or a individual computing device 304 can include a counting grid ("CG") system for implementing the techniques described herein.

Example device 300 can include any type of computing device having one or more processing unit(s) 308 operably connected to computer-readable media 310. The connection may be via a bus 312, which in some instances may include one or more of a system bus, a data bus, an address bus, a PCI bus, a Mini-PCI bus, and any variety of local, peripheral, and/or independent buses, or via another operable connection. Processing unit(s) 308 can represent, for example, one or multiple microprocessors, controllers or any other suitable type of processors for processing computer executable instructions to control the operation of the device in order to facilitate cross-channel communication. In some examples, where a system on a chip architecture is used, the processing unit(s) 308 can include one or more fixed function blocks (also referred to as accelerators) which implement a part of the method by employing the CG system in hardware (rather than software or firmware).

Example device 300 can include, but is not limited to, one or multiple desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, and/or any other sort of computing devices such as one or more separate processor device(s), such as CPU-type processors (e.g., micro-processors), GPUs, and/or accelerator device(s).

In some examples, distributed computing resource(s) 302 can include one or more computing devices that operate in a cluster and/or other grouped configuration to share resources, balance load, increase performance, provide fail-over support and/or redundancy, and/or for other purposes. Although illustrated as desktop computers, distributed computing resource(s) 302 and/or individual computing device 304 can include a diverse variety of device types and are not limited to any particular type of device. For example, distributed computing resource(s) 302 can include any type of computing device having one or more processing unit(s) operably connected to computer-readable media, I/O interfaces(s), and/or network interface(s).

In some examples, network(s) 306 can include public networks such as the Internet, private networks such as an institutional and/or personal intranet, or some combination of private and public networks. Network(s) 306 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communication protocols, including packet-based and/or datagram-based protocols such as internet protocol (IP), transmission control protocol (TCP), user datagram protocol (UDP), and/or other types of protocols. Moreover, network(s) 306 can also include a number of devices that facilitate network communications and/or form a hardware basis for the networks, such as switches, routers, gateways, access points, firewalls, base stations, repeaters, backbone devices, and the like. In some examples, videos can be received for processing by the CG system via the network(s) 306. In some examples, the feature representation, event(s), subsets of frames of videos, and/or videos can be transmitted via the network(s) 306 to other services that can make use of these features.

The computer-readable media 310 includes two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of physical machine-readable media suitable for storing electronic instructions.

In contrast, communication media embodies computer-readable instructions, data structures, program modules, and/or other data in a modulated data signal, such as a carrier wave, and/or other transmission mechanism. As defined herein, computer storage media does not include communication media.

In some examples, as shown regarding device 300, computer-readable media 310 can store instructions readable and/or executable by the processing unit(s) 308 and/or accelerator(s) 314. Executable instructions stored on computer-readable media 310 can include, for example, pre-trained CG model(s) 316, counting grid(s) 318, and/or CG manager 320 and other modules, programs, and/or applications that can be loadable and executable by processing unit(s) 308 and/or accelerator(s) 314 (e.g., operating systems, firmware).

In some examples, the CG manager 320 can configure the processing unit(s) and/or the accelerator(s) 314 to generate the pre-trained CG model(s) 316; generate CG(s) 318 of videos; aggregate features of active positions of a CG generated for a video; post-process aggregated features (e.g., normalize, dimensionally reduce); identify event(s) associated with aggregated features; provide one or more of frames of a video, event(s), feature representations, and/or abbreviated forms to a user or another service for recognition or retrieval, in some examples, and in a format that is suitable for the purpose; and/or otherwise configure the example device 300 to accomplish the techniques discussed herein. In some examples, there can be differences between a CG manager on a client device and a CG manager on a training or back-end device. For example, the client CG manager can have components for video evaluation and the training or back-end CG manager can have components for training the pre-trained CG model(s) 316.

In some examples, the pre-trained CG model(s) 316, the counting grid(s) 318, and/or portions of the CG manager 320 can be implemented as hardware, such as, for example an integrated circuit or a specially configured processor such as, for example, one or more accelerator(s) 314. In some examples, one or more accelerator(s) 314 can take the place of the processing unit(s) 308 or can be additionally coupled to components of the example device 300 by bus 320. In some examples, the configuration of the accelerator(s) 314 can also take place of instructions stored on the computer-readable media 310. In some examples, the accelerator(s) 314 can be part of a device separate from example device 300. Accelerator(s) 314 can include, for example, CPU-type processor(s) 314(1), GPU(s) 314(2), FPGA(s) 314(3), digital signal processing ("DSP")-type accelerator(s) 314(4), and/or other accelerator(s) 314(N). In some examples, the example device 300 discussed herein can configure first processing unit(s) 308 and/or accelerator(s) 314 to perform CG model training and configure second processing unit(s) 308 and/or accelerator(s) 314 to be configured to be a CG or CG model configured as a hardware processor. In some examples, the computer-readable media 310 can be accessible to the accelerator(s) 314 and/or the processing unit(s) 308.

Some or all of computer-executable instructions and/or hardware implementations of the pre-trained CG model(s) 316, the CG(s) 318, and/or the CG manager 320 can be available to, accessible from, or stored on a remote device and/or distributed computing resources 102, which can be configured as a cloud services system. In some examples, any number of modules could be employed and techniques described herein as employed by one or more modules can be employed by a greater or lesser number of modules. In some examples, the example device 300 can store, remotely access, or make available, via the network 106, the pre-trained CG model(s) 316, the CG(s) 318, the CG manager 320, videos, frames, scenes, feature representations, abbreviated forms, and/or events.

In the illustrated example, computer-readable media 310 can also include a data store 322. In some examples, data store 322 includes data storage such as a database, data warehouse, and/or other type of structured or unstructured data storage. In some examples, data store 322 includes a relational database with one or more tables, indices, stored procedures, and so forth to enable data access. In some examples, the data store 322 can store pre-trained CG model(s) 316, CGs 320, training data such as, a corpus of video data to generate the pre-trained CG model(s) 316. Data store 322 can store data for the operations of processes, applications, components, and/or modules stored in computer-readable media 310 and/or executed by processor(s) 101, and/or accelerator(s) 314. Alternately, some or all of the above-referenced data can be stored on separate memories such as memories of the distributed computing resource(s) 102 and/or computing device(s) 104 a memory on board a CPU-type processor (e.g., microprocessor(s)), memory on board a GPU, memory on board an FPGA type accelerator, memory on board a DSP type accelerator, and/or memory on board another accelerator).

Example device 300 can further include input/output (I/O) interface(s) 324, to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In some examples, the I/O interface(s) 324 can allow the example device to communicate with one or more cameras and/or microphones to capture audio/video information.

Example device 300 can also include network interface(s) 326 to enable communications over network 106. Such network interface(s) 326 may include one or more network interface controllers (NICs) or other types of transceiver devices to send and receive communications over a network 106.

Example Techniques

Figure 4:
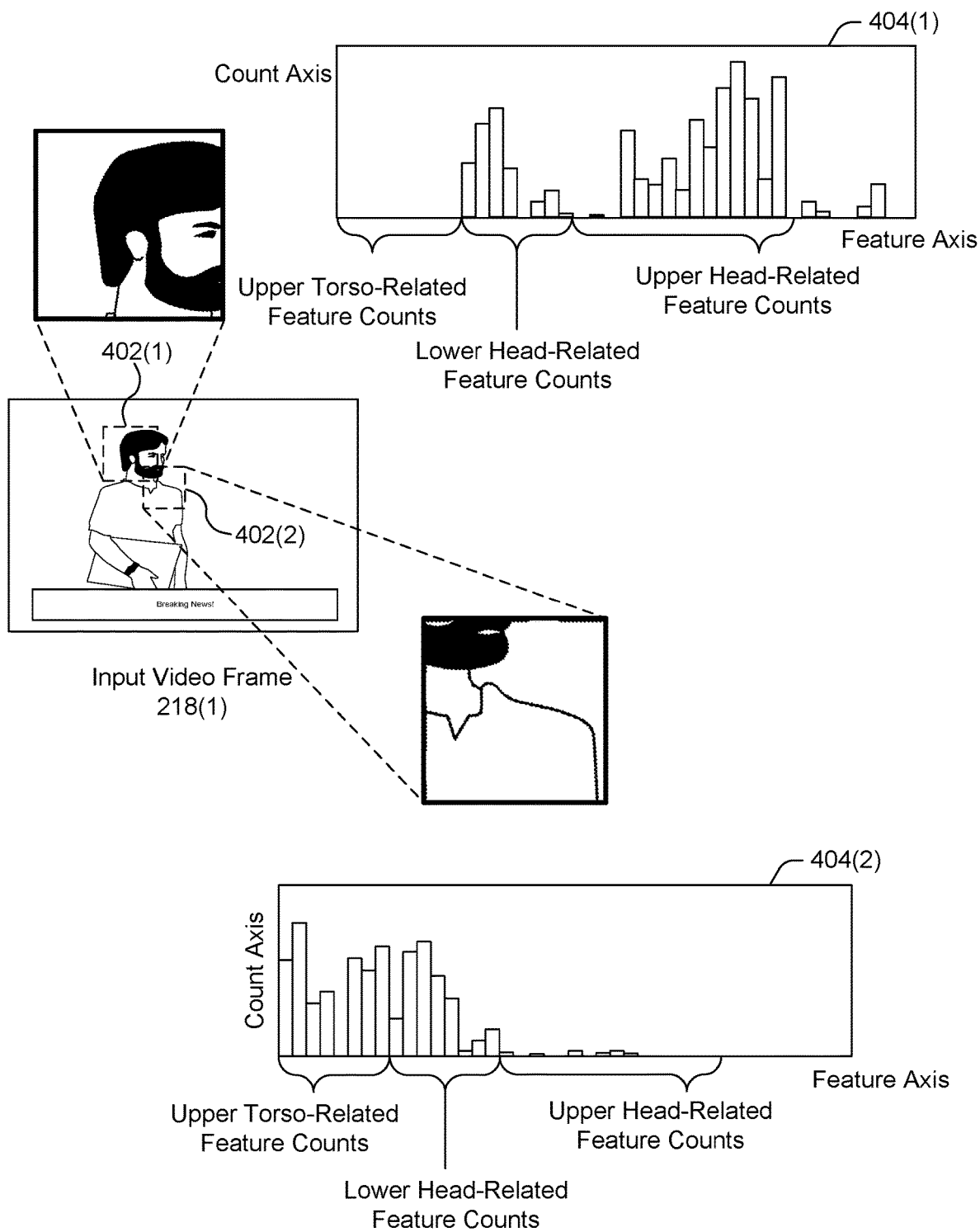
FIG. 4 is a block diagram of an example input video frame, example windows, and corresponding example feature counts.

FIG. 4 depicts an example input video frame ("IVF") 218(1) and a block diagram of windows 402(1) and 402(2) and feature counts 404(1) and 404(2), as discussed further herein. In some examples, the CG manager 320 can be configured to generate CGs based on the premise that frames contain features. In some examples, the features can be recognizable by humans. In some examples, the features are visual primitives. In some examples, the features are one or more of descriptors derived by a machine learning method, phase data, and/or other image-related properties.

In some examples, the CG manager 320 can be configured to generate CGs based on the further premise that depending on which portion of the frame is scrutinized, the particular features that appear in the scrutinized portion vary depending on which portion is examined. These portions of a frame are referred to as windows herein and the amounts of distinct features that appear in a window are referred to as a feature count. Therefore, according to some examples, a particular window of a frame will have a feature count that differs from the feature count of a different window of the same frame.

For example, and put simplistically, a first window 402(1) of the example IVF 218(1) is associated with a first feature count 404(1), which differs from a second feature count 404(2) associated with a second window 402(2) of the IVF 218(1). Feature counts 404(1) and 404(2) include counts for features such as upper-torso-related features, lower-head-related features, and upper-head-related features. In this simplified example, discrete points along the feature-axis could therefore correspond to visual features such as, for example, shoulder, lower jaw, mouth, eye, nose, ear, beard, head hair, eyebrow, etc. In some examples, the count can be a number of pixels in the window or a number of regions of pixels in the window that correspond to a particular feature. For example, for the second window 402(2) and using a sample region size of 5×5 pixels hypothetically, 5 regions are attributable to shoulder, 15 regions are attributable to chest, 5 regions are attributable to jaw, 3 regions are attributable to mouth, etc.

Furthermore, in some examples, the CG manager 320 can be configured to generate CGs based on the premise that the CG should contain a window that has a distribution of feature counts ("feature distribution") that corresponds to the feature distribution of a frame (or a window of a frame). In regards to example IVF 218(1), this means that in some examples the CG manager 320 can be configured to generate a CG such that there is a window at a location in the CG that has a feature distribution that imitates the feature distribution of IVF 218(1).

Figure 5:
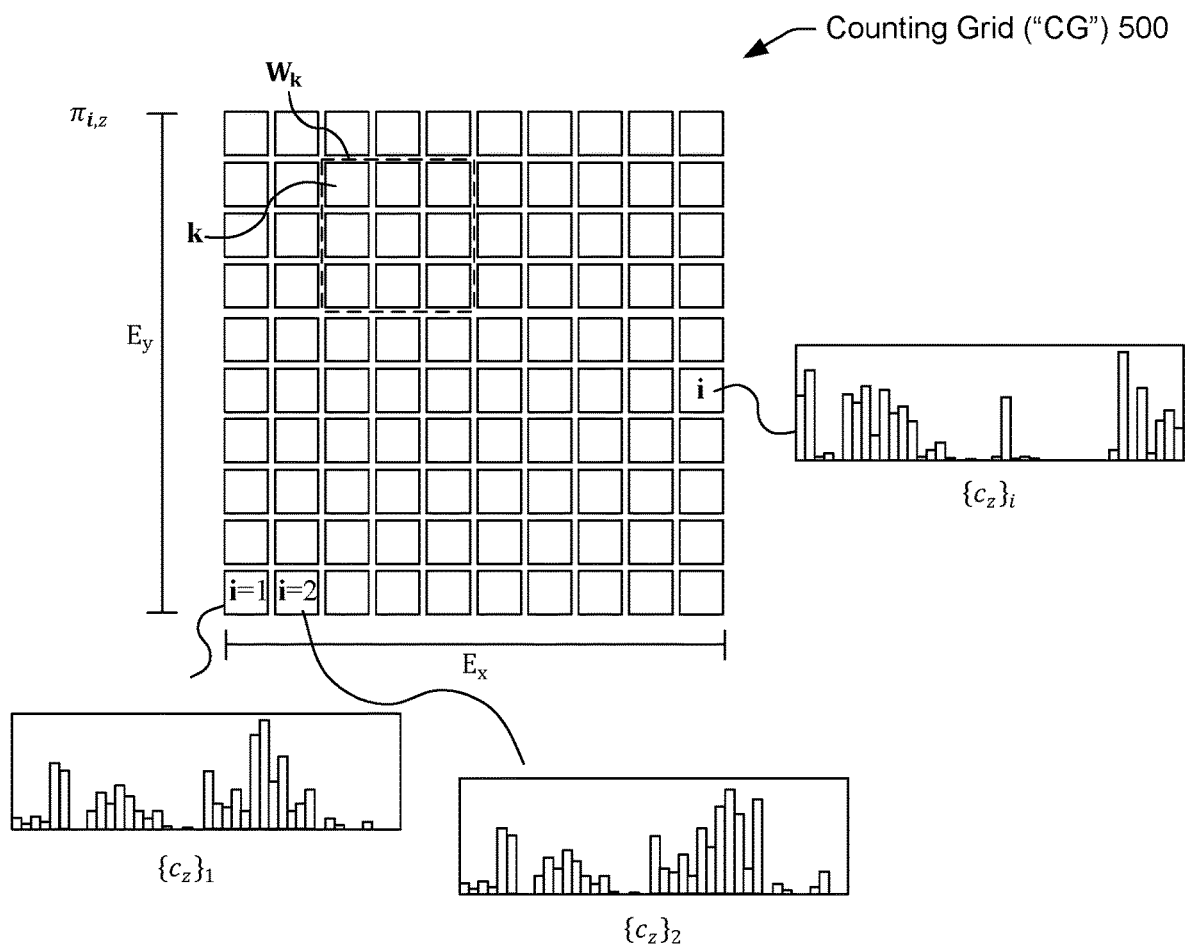
FIG. 5 is a representation of an example counting grid for creating video representations having the attributes discussed above and suitable for video event retrieval and video event recognition

FIG. 5 depicts a representation of an example counting grid ("CG") 500 for creating representations having the attributes discussed above and suitable for video event retrieval and video event recognition. In some examples, the CG manager 320 can generate the example CG 400 from a corpus of video data at training time and, at evaluation time for a particular video, use the generated counting grid 500 as an initial counting grid for generating the counting grid for the video. Using a same pre-trained counting grid model (i.e., initializing the process using the counting grid model) trained on a large corpus of documents for generating representations for disparate videos provides spatially consistent counting grid arrangements for the disparate videos processed using a counting grid derived from the pre-trained counting grid model.

In some examples, the example CG 500 includes a grid of feature counts that span the space of all possible feature count combinations for a particular frame. In this example, the extent of the space of all the possible feature count combinations is constrained by the properties of the frame outside the window and/or the size and the location of the window of interest of the frame. In some examples, the example counting grid 500 includes a grid of feature counts that span the space of all the possible feature count combinations on which a counting grid model has been trained.

In some examples, the CG manager 320 is configured to generate a CG based on the premise that a frame has a representative window in the grid in which the feature counts mimic the feature distribution in the image. In some examples, the example CG 400, $\pi_{i,z}$ includes a model that assumes that frames can be represented by a histogram, $\{c_z\}$. In some examples, this representation can be a bag of features $c=\{c_z\}$, where $c_z$ denotes counts of features z. Put another way, in some examples, features, z, are the elements of a bag (or, equivalently, a multi-set) and $c_z$ are the quantities of the features, z, present in the bag. As discussed above, in some examples, the counts can be numbers of pixels, regions of pixels, and/or other units or indexes which can be associated with features.

In some examples, the example CG 400, $\pi_{i,z}$, includes a set of counts of features indexed by feature on a 2D discrete grid $i=i_x, i_y) \in E=[1 \ldots E_x] \times [1 \ldots E_y]$, where i is an index that addresses a generic location on the grid. In some examples, the set of counts of features is a normalized set of counts of features. In examples where the CG manager 320 configures the example device 300 to normalize the sets of counts of features, in some examples a sum of the normalized feature count at a location i, $\Sigma_z \pi_{i,z}$, can equal 1.

In some examples, the example CG 500 follows the premise that a given bag of image features, $\{c_z\}$, follows a distribution found somewhere in the CG. Following this premise, the CG manager 320 can generate a bag of features for a location, k, by averaging all the feature counts in a window, $W_k$, placed at location $k=k_x, k_y$ in the example CG 500 (e.g., $W_k=[k_x, \ldots, k_x+W_x-1] \times [k_y, \ldots, k_y+W_y-1]$).

In some examples, the window size can be fixed (e.g., W=8, W=10, W=16, W=20, W=24, W=28, W=32). In some examples, the window size can be trained. In some examples, the size of the counting grid can be fixed or learned as well. In some examples, $E=(E_x, E_y)$, the extent (or size), of the example counting grid 500 can be set at 16. In some examples, the size is less than 16. In some examples, the size is greater than 16.

In some examples, the CG manager 320 generates the example CG 500 progressively frame-by-frame by generating a bag of features for a frame at one location. In some examples, to generate the counting grid, the CG manager 320 can generate a bag of features, $\{c_z\}$, by selecting a location k in the counting grid, calculating a distribution, $$h_k = \frac{1}{|W_k|} \sum_{i \in W_k} \pi_i,$$

for the window $W_k$ at location k of the counting grid, and generating the bag, $\{c_z\}$, at the location k with distribution $h_k$. In other words, the position k of the window $W_k$ can be treated as a latent variable in some examples. Accordingly, any number of techniques to expose hidden variables can be used to expose the position at which to generate a bag of features. For example, hidden Markov models, factor analysis, principle component analysis, latent semantic analysis, estimation-maximization ("EM") algorithms, latent Dirichlet allocation, and/or other stochastic methods can be used to expose k. Note that both i and k are used herein as generic locations within the example CG 500, but k is used to denote a position k of a window $W_k$ according to the premises discussed above.

In some examples, the probability of generating a bag of features $c=\{c_z\}$ in location k is:

$$p(c \mid l = k) = \prod_z (h_{k,z})^{c_z} = \mu \prod_z \left( \sum_{i \in W_k} \pi_{i,z} \right)^{c_z} \quad (1)$$

where $\mu$ is a normalization constant, in an example including normalization of the feature bags. In some examples $$\mu = \frac{1}{|W_k|} \sum_z c_z.$$

According to this example, in order to jointly generate a counting grid for a set of bags of features, $\{c_z^t\}$, indexed by t, and the corresponding latent window locations $\{l^t\}$ in the grid, the CG manager 320 can generate the example CG 500 as $$P(\{c^t\}, \{l^t\}) \propto \prod_t \sum_k \prod_z \left( \sum_{i \in W_k} \pi_{i,z} \right)^{c_z^t} \quad (2)$$

In some examples, where an EM algorithm is used to expose the latent variables, the counting grid, $\pi$ can be estimated by maximizing the log likelihood of the joint distribution with an EM algorithm have the following estimation and maximization operations:

$$E \text{ operation: } q(l^t = k) \propto \exp\left( \sum_z c_z^t \log h_{k,z} \right) \quad (3)$$

$$M \text{ operation: } \pi_{i,z} \propto \pi_{i,z}^{old} \sum_t \left( c_z^t \sum_{k|i \in W_k} \frac{q(l^t = k)}{h_{k,z}} \right) \quad (4)$$

where $q(l^t=k)$ denotes the posterior probabilities $p(l^t=k|c^t)$ and $\pi_{i,z}^{old}$ is the counting grid at the previous iteration.

In some examples, the CG manager 320 can introduce an additional constraint to ensure that a same input video should have a unique representation output (i.e., a same video results in a same representation output that is different from a representation output of a different video). In some examples, the CG manger 320 can jointly generate a counting grid for a set of bags of features, $\{c_z^t\}$, indexed by t, and the corresponding latent window locations $\{l^t\}$ in the grid, constrained by a Dirichlet prior with parameters $\beta \pi^{ref}$ as $$P(\{c^t\}, \{l^t\}) \propto \prod_t \sum_k \prod_z \left( \sum_{i \in W_k} \pi_{i,z} \right)^{c_z^t} \prod_k \prod_z (\pi_{k,z})^{\beta \pi^{ref}} \quad (5)$$

where, $\pi^{ref}$ denotes a pre-trained counting grid, and $\beta$ is a weighting factor to adjust the influence of the prior in the learning process. Based on this example and in an example where an EM algorithm is used to expose the latent variables, the EM algorithm can be:

$$E \text{ operation: } q(l^t = k) \propto \exp\left( \sum_z c_z^t \log h_{k,z} \right) \quad (6)$$

$$M \text{ operation: } \pi_{i,z} \propto \beta \pi_{i,z}^{ref} + \pi_{i,z}^{old} \sum_t \left( c_z^t \sum_{k|i \in W_k} \frac{q(l^t = k)}{h_{k,z}} \right) \quad (7)$$

In some examples, the CG manager 320 can learn the pre-trained counting grid, $\pi^{ref}$, from a large corpus of video data in order to ensure that CGs generated from the pre-trained CG are spatially consistent (i.e., assigning similar frames between two videos to similar places in the CGs generated for the two videos), resulting in a same representation output for a same video and one that is different from a representation output of a different video.

In some examples, any other technique can be used that sufficiently jointly locationally maps individual bags of features to locations within the example CG 500. In sum, the generation operation includes jointly distributing a set of feature bags (having the properties described above), $\{c_z^t\}$, to locations $\{l^t\}$ within the grid (i.e., "location distribution" of feature bags, or, equivalently represented as $q(l^t=k)$) in such a manner that, for a frame of a video having a first feature distribution, there exists a similar second feature distribution corresponding to a window in the example CG 500. In some examples, individual bags are mapped (or, equivalently, locationally distributed) to a (possibly) different location within the example CG 500.

As discussed above, in some examples, the CG manager 320 can generate the example CG 500 using training video frames. In some examples, the CG manager 320 can generate the example CG 500 at evaluation time for a specific video. In either example, after generating the example CG 500, the CG manager 320 can obtain two outputs from the method for exposing the latent variables (e.g., from the EM algorithm if one is used): the first output is the counting grid, $\pi$, which is able to generate training features and the second output is the location distribution (or assignment), $q(l^f=k)$, of input frames to locations in the example CG 500.

In some examples, the quality of the fit to different windows of the grid of the t-th bag (in particular) can be seen from the posterior distribution, or its variational counterpart, $q(l^f=k)$, which are functions of the counts seen in the t-th bag. By following these premises, the CG manager 320 generates an example CG 500 that assigns (i.e., locationally distributes) frames having similar features to the same or nearby locations within the example CG 500. According to the examples discussed above, similar or same frames are more likely to be generated by the same or similar distribution $h_k$, which, in some examples, can be calculated from the same window or overlapped windows on the example CG 500.

In some examples, the features, z, are one or more of descriptors derived by a machine learning method, phase data, and/or other image-related properties. For example, the features can be frame-level descriptors (e.g., a receptive field) such a deep convolution neural network (CNN) descriptor. In an example, where a receptive field is used, the count can be the response of the receptive field in each dimension, since CNN descriptors can be treated as a response to a visual primitive. In this example, the CG manager 320 can normalize the CNN descriptors in order to treat the CNN descriptor response as a bag of visual primitives representation. In some examples, any machine learning method can be used to derive the features and/or the counts of the features. In some examples, activations of the first fully-connected layer and the last convolutional layer after rectified linear unit of a pre-trained AlexNet can be used to generate the example CG 500. In some examples, the CG manager 320 can generate the example CG 500 using any appropriate machine learning descriptors (e.g., descriptors derived by a Bayesian network, deep neural network, long short-term memory, recurrent neural network, CNN, AlexNet, clustering technique, segmentation technique) or other descriptors (e.g., user-supplied tags).

Example Evaluation

Figure 6:
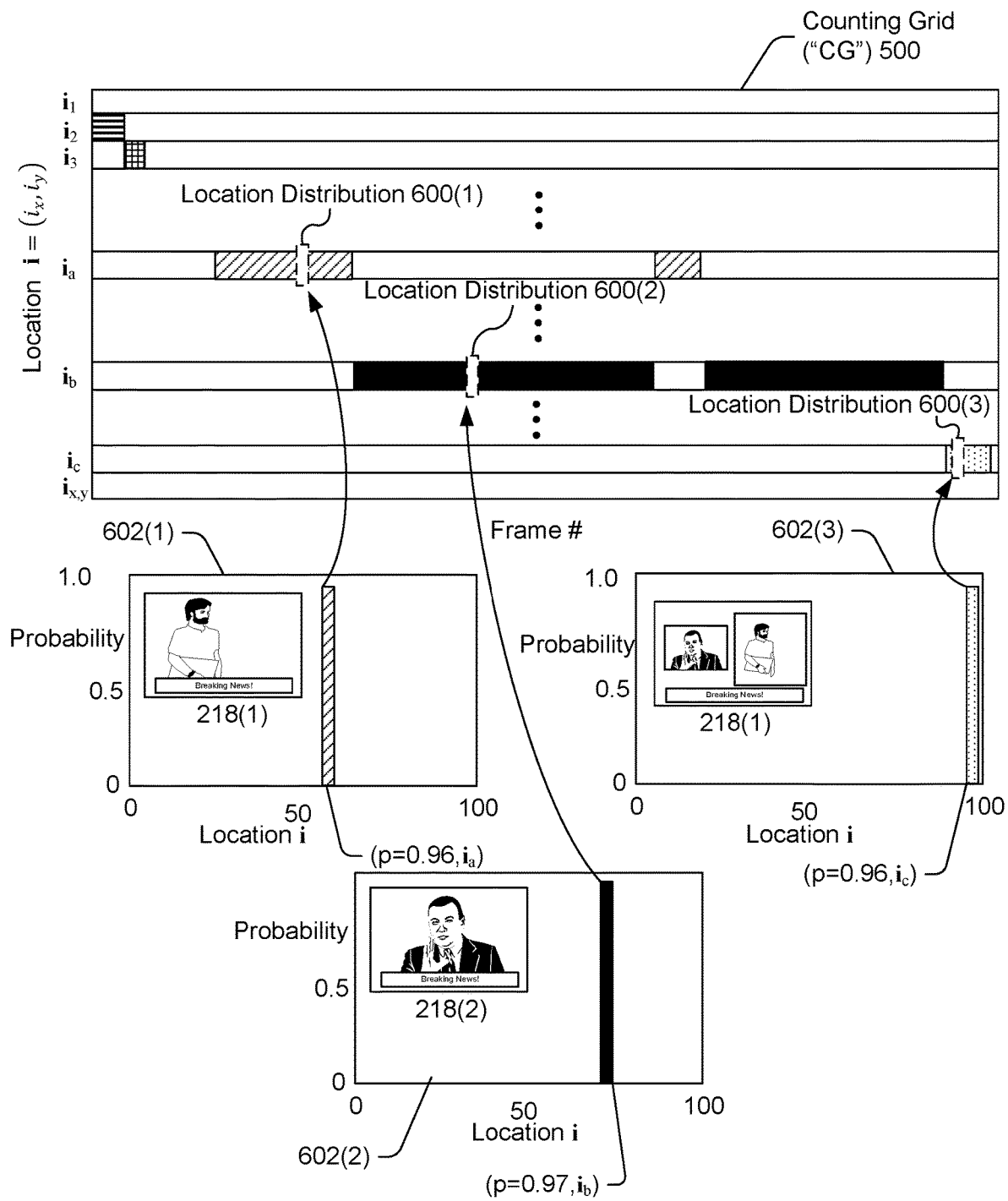
FIG. 6 is a diagram of an example location distribution of frames of an input video by an example counting grid model.

FIG. 6 is a block diagram of an example location distribution of frames of an example input video 200 by an example CG 500. FIG. 6 portrays the assignment of frames by any of the techniques discussed herein to locations within the example CG 500. FIG. 6 depicts disparate locations, i, within the example CG 500 along the vertical axis and a frame number (or other timeline or index, as it may be) of the example input video 200 along the horizontal axis. For ease of interpretation of the figure, all but three assignments are represented as marked portions of the diagram, which indicate an assignment of one or more frames to the corresponding location in the CG 500 indicated by the vertical axis. Note that the markings correspond to scenes 204-208, respectively, as, in this example, these scenes have similar feature distributions and are therefore assigned to same or similar locations in the example CG 500 as discussed herein.

FIG. 6 includes example assignments 600(1), 600(2), and 600(3) of IVFs 218(1), 218(2), and 218(3), respectively. In some examples, and as discussed herein, a frame can be assigned to a location (i.e., locationally distributed) within the example CG 500 based at least in part on the frame having a maximum probability of generating a bag of features at that location, $q(l^f=k)$. In some examples, a frame can be assigned to a location within the example CG 500 based at least in part on the frame having a high probability. In the depicted example, the set of feature bags and the CG generation have been normalized so that a high probability is close to 1.

Figure 7:
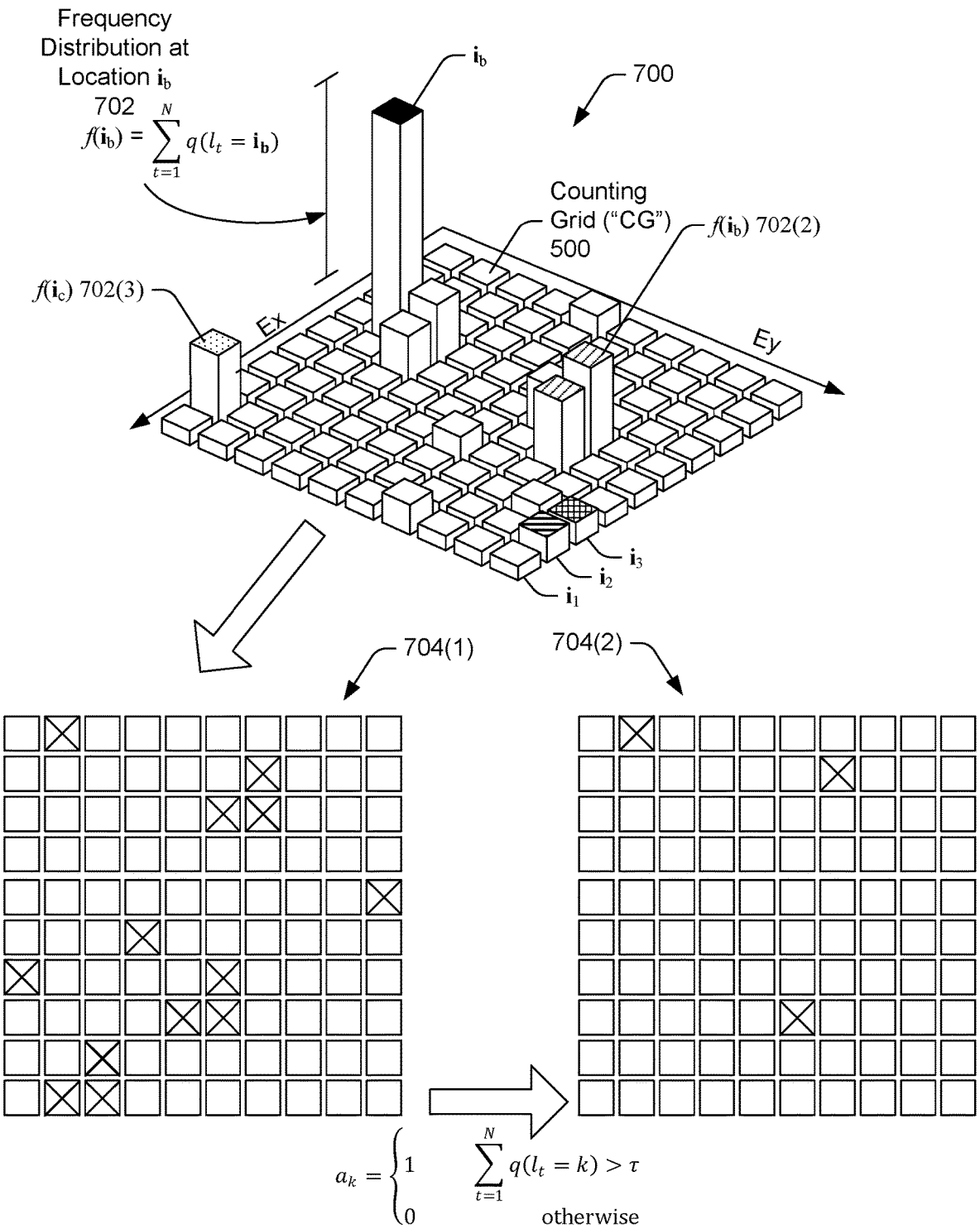
FIG. 7 is a diagram of an example frequency distribution of frames of an input video to locations of an example counting grid.

For example, probability graph 602(1) depicts the likelihood of the joint distribution resulting in assigning IVF 218(1) to location $i_a$ within the example CG 500 according to any of the techniques discussed herein. In the depicted example, the likelihood is 0.96, which is close to 1, therefore the CG manager 320 can assign the IVF 218(1) to location $i_a$, as location distribution 600(1) depicts. Similarly, probability graph 602(2) depicts a likelihood of 0.97 of the joint distribution resulting in assigning IVF 218(2) to location $i_b$ and probability graph 602(3) depicts a likelihood of 0.96 of the joint distribution resulting in distributing (or assigning) IVF 218(3) to location $i_c$. Accordingly, location distributions 600(2) and 600(3) illustrate locational distributions of IVFs 218(2) and (3) to locations $i_b$ and $i_c$ of the example CG 500. Ultimately, this means that a frame having a particular feature count and/or feature distribution can be assigned to a location in the example CG 500 that has a similar feature count and/or feature distribution, respectively. This is why scenes 204-208 have been represented using the same markings. In this example, the CG manager 320 would assign the respective frames of scenes 204-208 to similar or same areas of the example CG 500 because the respective frames of the scenes 204-208 have features that are similar to each other. Note that FIGS. 6 and 7 depict frames of these scenes at same or similar locations of the example CG 500. In some examples, calculating a likelihood that a frame would be assigned to a particular location can be one manner of estimating that descriptors associated with a frame of the video comport with a feature bag associated with a particular location.

In some examples, the CG manager 320 can sample the example input video 200 at 5 frames per second to extract features of frames of the example input video 200. In some examples, lower or higher frame rates can be used to sample. In some examples, dimensions of the feature bags can be determined by the descriptor type and/or machine learning type chosen. For example, in some examples, the feature bags of the example CG 500 can have dimensions in the thousands (e.g., 4096 dimensions if the CG manager 320 uses ReLU to train the example CG 500). In some examples, the dimensions of the feature bags can be in the hundreds (e.g., 256 dimensions) while still maintaining comprehensive and distinct representations of videos.

Once the CG manager 320 has assigned the frames for which a feature representation, an abbreviated form, and/or event(s) are desired, the CG manager 320 can accumulate the location distributions of the frames and obtain the frequency distribution of the frames assigned to the locations. In some examples, by using normalized machine learning features (e.g., normalized CNN features of the frames) and pre-training, the assignment locations converge so that accumulating the locations to which frames are assigned is easier. In some examples, the CG manager 320 can include a clustering operation to aggregate the locations to which frames are assigned.

FIG. 7 depicts an example frequency distribution 700 of the frames of example input video 200 to the locations of the example CG 500, $\{l^r\}$. Again, the same markings are used to denote frames having similar features. In some examples, to derive a feature representation for a video, the CG manager 320 can first generate a counting grid for the video, then identify an active map from the counting grid, and aggregate the feature bags over the active map to obtain the video representation. In some examples, the CG manager 320 can conduct further post-processing on the video representation to obtain a final feature representation, as discussed below.

In some examples, the frequency distribution 700 of the frames of example input video 200 to the locations of the example CG 500, $\{l^r\}$ can be a count of frames assigned over the locations in the example CG 500 (e.g., the frequency distribution can be a bag comprising the locations of the example CG 500 as the elements and the number of frames assigned to the locations as the counts for the respective elements). For example, the frequency distribution at location $i_a$ ($f(i_b)$ at 702) of CG 500 can be $\sum_{t=1}^{N} q(l_t = k = i_b)$ or, in other words, the sum of the of the number of frames assigned to the location $i_a$. FIG. 7 depicts the frequency distribution 700 as a three-dimensional bar graph and also depicts the frequency distributions at location $i_a$ (702(2)) and $i_c$ (702(3)), as well, among other example distributions. Note that the distribution (assignment) of frames related to the court scene were distributed to similar locations within the example CG 500, as FIG. 7 depicts.

In some examples, the CG manager 320 can aggregate the distributions at the locations $\{l^r\}$ to which frames have been assigned, where the distribution at a location k is denoted $$h_k = \frac{1}{|W_k|} \sum_{i \in W_k} \pi_i.$$

As used hereafter, these distributions are referred to as feature bags of the counting grid. In some examples, in order to suppress redundant or noisy information, the CG manager 320 can identify an active map 704(1) from the example CG 500. In some examples, the active map is the locations, $\{l^r\}$, to which frames have been assigned by the CG manager 320. For example, active maps 704(1) and 704(2) denote locations in the example 500 that are active (i.e., "active coordinates," "activated locations") with an "X." In some examples, the CG manager 320 generates the active map by converting the frequency distribution of the frames to a binary map. For example, the active map can be $A = \{a_k | k \in E\}$, $a_k \in \{0,1\}$. In some examples, the CG manager 320 can assign an active status to a location if it meets a threshold. To generate the active map according to this example, the active map can be computed as $$a_k = \begin{cases} 1 & \sum_{t=1}^{N} q(l_t = k) > \tau \\ 0 & \text{otherwise} \end{cases} \quad (8)$$

where $\tau$ is the threshold. In some examples, the threshold can be used to filter out very short shots (e.g., shots of only a few frames, depending on the threshold size). For example, the threshold can be set to 4 frames so that locations of the example CG 500 having four or less frames assigned thereto will not qualify to be included in the active map 702(2). In some examples and depending on the use or particular videos (e.g., known artifacts or depending a frame capture rate a second of time at a high frame capture rates could be equivalent to thousands of frames), the threshold can be increased or decreased. For example, the frame threshold can be 15, 50, 100, or thousands of frames, depending on the frame rate of the input video.

Active map 702(2) depicts only three active locations in the example CG 500 that have a number of frames respectively assigned thereto that exceed an example threshold. In some examples, if the threshold was set lower, the active map would include more active locations. In some examples, the threshold can be lowered if important scenes of short duration are being removed from the video representation.

Once the CG manager 320 generates the active map, the CG manager 320 can aggregate the feature bags associated with the active grid to obtain a video representation. In some examples, the feature bags can be aggregated using sum-aggregation. In some examples, the grid aggregation could be derived as $$\phi_{CGA}(\pi, A) = \frac{\sum_{k \in E} a_k \left( \frac{1}{|W_k|} \sum_{i \in W_k} \pi_i \right)}{\sum_{k \in E} a_k} \quad (9)$$

In some examples, the CG manager 320 can use vector of locally aggregated descriptors ("VLAD") to aggregate the activated counting grid feature bags.

In some examples, since frames assigned (or, equivalently, distributed) to a same or similar location on a counting grid generated from a pre-trained counting grid model are usually from the same shot, the activated counting grid feature bags (i.e., feature bags associated with active locations of the counting grid) can be representations of scenes from the video. Therefore, sum-aggregating the activated counting grid feature bags balances the contribution of scenes to the video representation.

In some examples, the CG manager 320 can use the video representation, $\phi_{CGA}(\pi, A)$, to facilitate video recognition and/or retrieval. In some examples, the video representation can be a tensor. In some examples, the video representation can be a feature bag. In some examples, this representation can be used to generate a frame mask to obtain an abbreviated form of the video. In some examples, categories, tags, and/or other event descriptions can be derived from the representation to facilitate video recognition and/or retrieval.

In some examples, the CG manager 320 can conduct post-processing on the video representation, $\phi_{CGA}(7r, A)$ to receive a final video representation, $\phi_{CGA}'(\pi, A)$, (or final feature representation). For example, the CG manager 320 can normalize, whiten, and/or dimensionally reduce the video representation. In some examples, the CG manager 320 can power normalize, whiten, and then normalize the video representation. In some examples, CG manager 320 can $l_2$-normalize, PCA-whiten, and then $l_2$-normalize the representation again. In some examples, the CG manager 320 can power normalize, PCA-whiten, and then $l_2$-normalize the representation.

In some examples, the CG manager 320 can conduct power normalization with an exponent value, $\alpha$, that depends on the type of descriptors used to train the example CG 500. For example, for an example CG 500 trained using activations of a first fully-connected layer of a CNN, the exponent value can be kept low (e.g., 0.2) whereas for an example CG 500 trained using activations of a last convolutional layer after a rectified linear unit, the exponent value can be set high (e.g., 0.8).

In some examples where the CG manager 320 uses VLAD, the CG manager 320 can also dimensionally reduce the video representation for VLAD encoding (e.g., dimensionally reduce the video representation to 256 dimensions with PCA-whitening). In some examples, the CG manager 320 can train CGs using different machine learning techniques and/or using different descriptors. In this example, the CG manager 320 can concatenate video representations derived from differently trained CGs to enhance retrieval performance. In some examples, the CG manager 320 can conduct query expansion on the video representation. For example, the CG manager 320 can use AQE and/or DoN since the video representation is compatible with those techniques. In some examples, the resultant representation based on the query expansion can be a global representation of the video that includes video feature terms disparate from features terms associated with the counting grid. For example, descriptors may not comport with common "keywords" and a global representation can semantically correlate one or more feature with "keywords."

Example Processes

FIG. 8-FIG. 11 illustrate example processes 800, 900, 1000, and 1100, which can be performed in whole or in part. These processes can, but need not be, performed using the example device 300 of FIG. 3.

Figure 8:
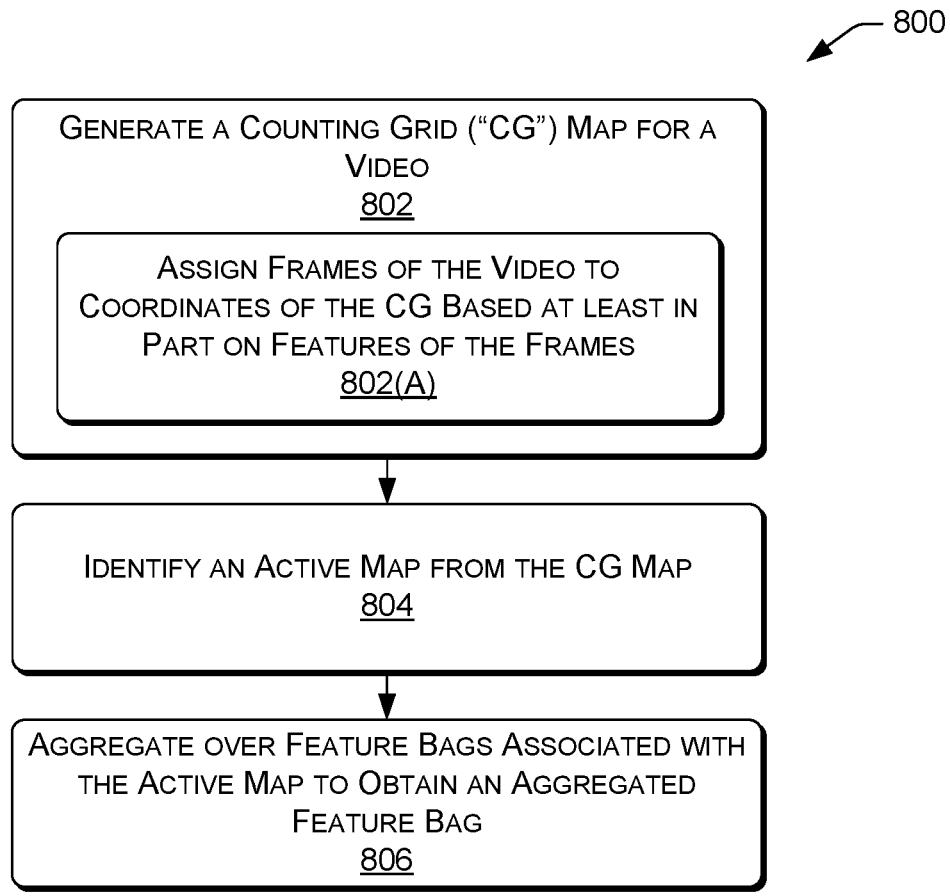
FIG. 8 is a flow diagram illustrating an example process to create a video representation for a video using a counting grid.

FIG. 8 depicts an example process 800 of implementing video representation using a counting grid.

At 802, CG manager 320 can generate a CG map for a video in any manner described herein. In some examples, the counting grid map can include feature bags associated with coordinated of the counting grid map. In some examples, generating the CG map for a video can include assigning (802(A)) frames of the video to coordinates of the counting grid maps based at least in part on features detected from the frames. In some examples, the assignment can be further based on a relationship between the features detected from the frames and feature bags associated coordinates of the counting grid map.

At 804, the CG manager 320 can identify an active map from the CG map in any manner described herein. In some examples, the active map can include a subset of coordinates of the CG map to which the CG manager 320 has assigned frames.

At 806, the CG manager 320 can aggregate the feature bags associated with the active map to obtain an aggregated feature bag in any manner described herein. In some examples, the aggregated feature bag includes a representation of the video.

Figure 9:
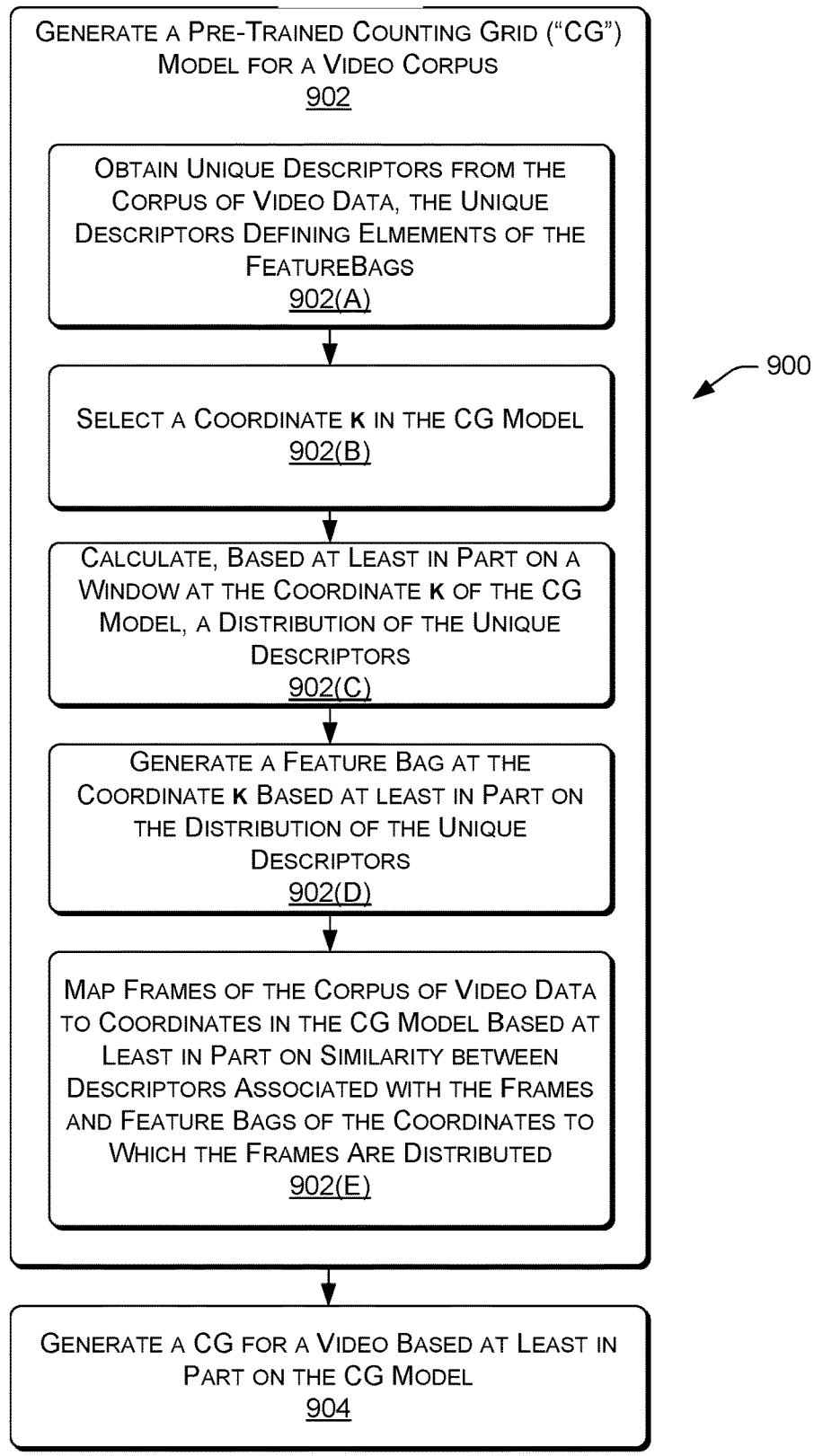
FIG. 9 is a flow diagram illustrating an example process to generate a counting grid using a pre-trained counting grid.

FIG. 9 depicts an example process 900 of generating a CG using a pre-trained CG.

At 902, the CG manager 320 can generate a pre-trained counting grid for a video corpus in any manner described herein. In some examples, 902 can include sub-operations 902(A)-(E). In some examples, more or less operations can be included.

At 902(A), the CG manager 320 obtains unique descriptors from the corpus of video data in any manner described herein. In some examples, the CG manager 320 includes a machine learning component to derive the unique descriptors. In some examples, the CG manager 320 can retrieve a feature vector stored from the data store 322 or from another device using an interface (e.g., I/O interface(s) 324, network interface(s) 326).

At 902(B), the CG manager 320 can select a coordinate k within the counting grid model in any manner described herein.

At 902(C), the CG manger 320 can calculate, based at least in part on a window at the coordinate k of the counting grid, a distribution of the unique descriptors in any manner described herein.

At 902(D), the CG manager 320 can generate a feature bag at the coordinate k based at least in part on the distribution of the unique descriptors in any manner described herein. In some examples, the generation of the feature bag at the coordinate k includes associating the feature bag and the coordinate k.

At 902(E), the CG manager 320 can map frames of the corpus of video data to coordinates within the counting grid model based at least in part on similarity between descriptors associated with the frames and feature bags of the coordinates to which the frames are mapped in any manner described herein. In some examples, mapping results in a location distribution of the frames in the pre-trained counting grid model.

At 904, the CG manager 320 can generate a CG for a video based at least in part on the pre-trained CG in any manner described herein. For example, when an EM algorithm is used in some examples, the M-operation can be modified as described above to account for use of the pre-trained CG. In some examples, after 902(E) is complete, two outputs are achieved: the counting grid model, $\pi$, and the location distribution of the frames of the video corpus. In some examples, when the CG manager 320 acquires an input video at evaluation time, the CG manager 320 can treat the frames of the input video as the t-th frame for the pre-trained CG model, $\pi$.

Figure 10:
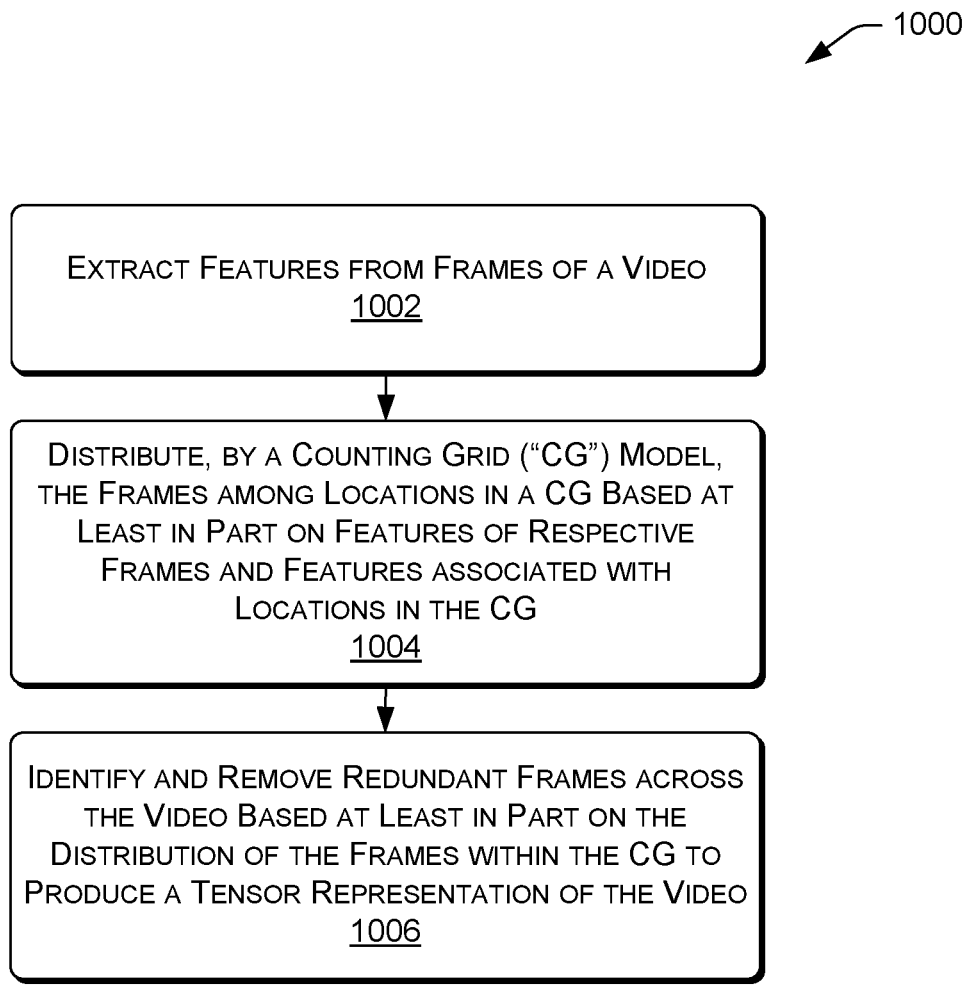
FIG. 10 is a flow diagram illustrating an example process to produce a tensor representation of a video.

FIG. 10 depicts an example process 1000 of generating a CG using a pre-trained CG.

At 1002, the CG manager 320 can extract features from frames of a video in any manner described herein.

At 1004, the CG manager 320 can distribute, by a CG model, the frames among locations in a CG based at least in part on features of respective frames of the video and features associated with locations in the counting grid in any manner described herein.

At 1006, the CG manager 320 can identify and remove redundant features across the frames based at least in part on the distribution of the frames within the counting grid to produce a tensor representation of the video in any manner described herein. In some examples, the CG manager 320 can identify and remove redundant frames across the video by generating an active map from the distribution of the frames within the counting grid and aggregating features associated with activated locations of the active map to produce the tensor representation of the video in any manner described herein. In some examples, the CG manager 320 can identify and remove redundant features. In some examples, identifying and removing redundant features and/or frames can suppress the influence of long scenes or redundant video data.

Figure 11:
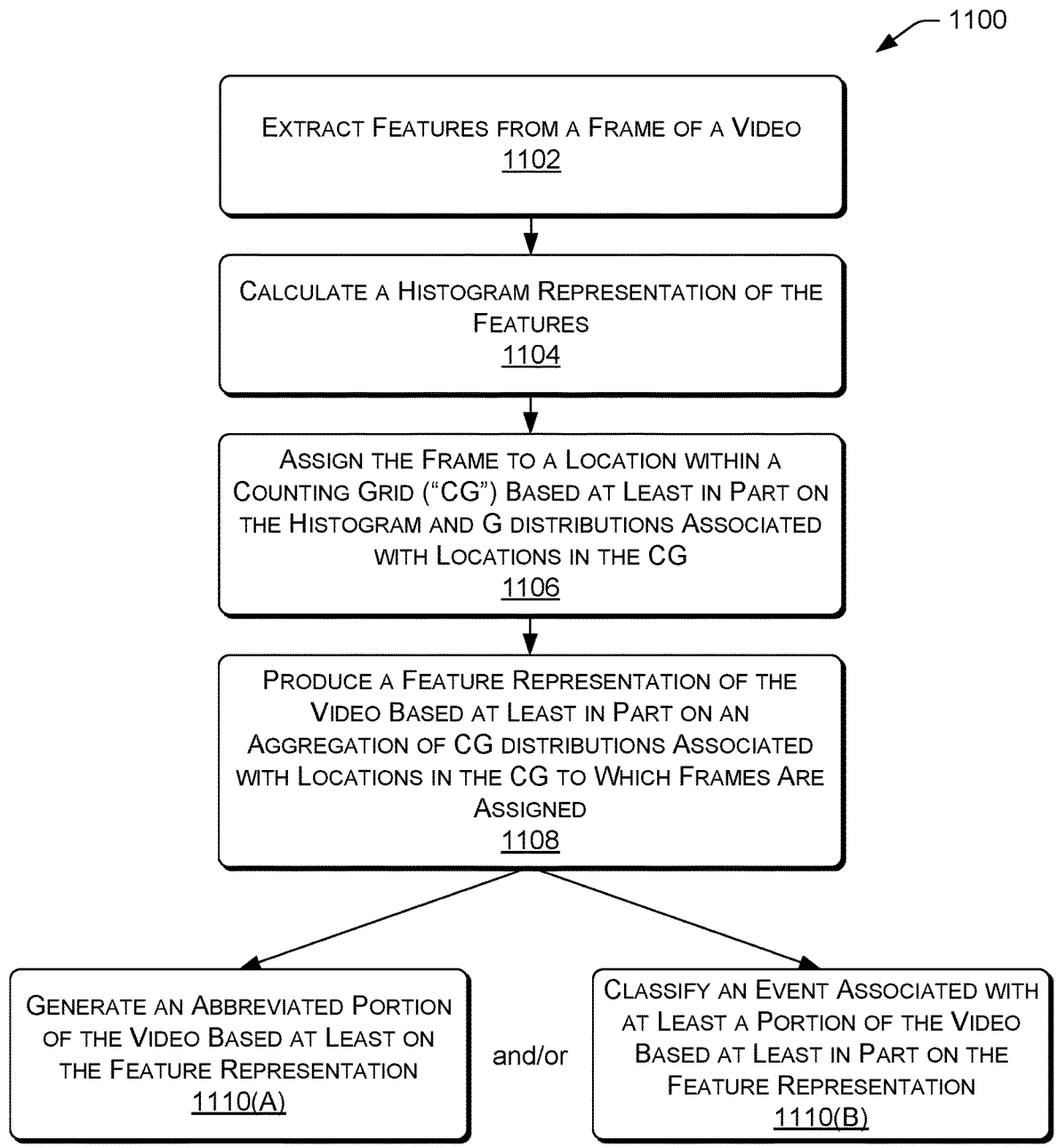
FIG. 11 is a flow diagram illustrating an example process to facilitate dialog between at least one agent and a channel.

FIG. 11 depicts an example process 1100 of producing a feature representation of a video for video recognition and/or retrieval.

At 1102, the CG manager 320 can extract features from a frame of a video in any manner described herein.

At 1104, the CG manager 320 can calculate a histogram representation of the features of the frame in any manner described herein.

At 1106, the CG manager 320 can assign the frame to a location within a CG based at least in part on the histogram and feature bags associated with locations in the CG in any manner described herein. In some examples, the feature bags are a histogram of feature counts per feature, as discussed above.

At 1108, the CG manager 320 can produce a feature representation of the video based at least in part on an aggregation of feature bags associated with locations in the CG to which frames are assigned in any manner described herein. In some examples, producing the feature representations can be based further upon one or more of normalization of aggregation of the feature bags, dimensional reduction of aggregation of the feature bags, query expansion of aggregation of the feature bags, or concatenation of two or more aggregations of feature bags derived from different CGs, among other performance-enhancing post-processing techniques.

At 1110(A), the CG manager 320 can facilitate video recognition in any manner described herein. In some examples, in order to facilitate video recognition, the CG manager 320 can generate an abbreviated portion of the video based at least in part on the feature representation in any manner herein.

At 1110(B), the CG manager 320 can facilitate retrieval of videos and/or portions of videos in any manner discussed herein. In some examples, the videos and/or the portions of videos can be associated with an event in any manner discussed herein. In some examples, the CG manager 320 can classify an event associated with at least a portion of the video based at least in part on the feature representation in any manner discussed herein.

Example Clauses

A. A method comprising: generating a counting grid map for a video, the counting grid map including feature bags associated with coordinates of the counting grid map; assigning frames of the video to coordinates of the counting grid map based at least in part on features detected from the frames; identifying an active map, the active map including a subset of coordinates of the counting grid map to which frames are assigned; and aggregating feature bags associated with the active map to obtain an aggregate feature bag, the aggregate feature bag including a representation of the video.

B. A method as paragraph A recites, further comprising: training a counting grid model from a corpus of video data, the training including: obtaining unique descriptors from the corpus of video data, the unique descriptors defining elements of the feature bags; selecting a coordinate k within the counting grid model; calculating, based at least in part on a window at the coordinate k of the counting grid, a distribution of the unique descriptors; generating a feature bag at the coordinate k based at least in part on the distribution of the unique descriptors, the generation of the feature bag at the coordinate k comprising an association between the feature bag and the coordinate k; and mapping frames of the corpus of video data to coordinates within the counting grid model based at least in part on similarity between descriptors associated with the frames and feature bags of the coordinates to which the frames are mapped, the mapping resulting in a location distribution of the frames in the counting grid model; and wherein generating the counting grid map for the video includes generating the counting grid map for the video based at least in part on the counting grid model.

C. A method as either paragraph A or B recites, wherein the elements of the feature bags correspond to descriptors identifying visual primitives.

D. A method as any one of paragraphs A-C recites, wherein training the counting grid model includes using an expectation-maximization ("EM") algorithm to estimate the counting grid model by maximizing a likelihood of a joint distribution over an index of the unique descriptors and latent window locations in the counting grid model.

E. A method as any one of paragraphs A-D recites, wherein generating the counting grid map from the pre-trained model includes using an expectation-maximization ("EM") algorithm to generate the counting grid map where a maximization ("M") operation includes a prior based at least in part on the counting grid model.

F. A method as any one of paragraphs A-E recites, wherein the prior is a Dirichlet prior with parameters based at least in part on the counting grid model and weighted to adjust influence of the prior on generating the counting grid map for the video.

G. A method as any one of paragraphs A-F recites, wherein a feature bag of the feature bags includes a normalized probability distribution of frame descriptors.

H. A method as any one of paragraphs A-G recites, the generating the counting grid map for the video including: mapping a frame of the video to a coordinate on the counting grid map based at least in part on an estimate that descriptors associated with the frame of the video comport with a feature bag associated with the coordinate.

I. A method as any one of paragraphs A-H recites, wherein identifying the active map includes: calculating a frequency distribution of the frames assigned to coordinates of the counting grid map; and converting the frequency distribution of the frames to the active map, the active map being a binary map having values denoting active coordinates and inactive coordinates of the counting grid map wherein a coordinate is an active coordinate when the coordinate has a number of frames assigned thereto that exceeds a threshold number of frames.

J. A method as any one of paragraphs A-I recites, wherein the aggregating feature bags includes one or more of: sum-aggregating, forming a fisher vector, or forming a vector of locally aggregated descriptors to obtain the aggregated feature bag.

K. A method as any one of paragraphs A-J recites, further comprising normalizing the aggregate feature bag; or dimensionally reducing the aggregate feature bag.

L. A method as any one of paragraphs A-K recites further comprising: conducting query expansion on the aggregate feature bag to obtain a global representation for the video, the global representation including video feature terms disparate from features terms associated with the counting grid; and making the global representation for the video available for recognition or retrieval.

M. A method as any one of paragraphs A-L recites, wherein the method includes sequentially: power normalizing the aggregate feature bag, whitening the aggregate feature bag, and re-power normalizing the aggregate feature bag.

N. A system comprising: one or more processors; an interface communicatively coupled with the one or more processors, the interface configured to: receive a video, provide the video to the one or more processors, and receive a tensor representation of at least a portion of the video from the one or more processors; the one or more processors configured to receive the video and perform operations comprising: extracting features from frames of the video; distributing, by a counting grid model, the frames among locations in a counting grid based at least in part on features of respective frames and features associated with locations in the counting grid; and identifying and removing redundant frames of the video based at least in part on the distribution of the frames within the counting grid to produce a tensor representation of the video.

O. A system as paragraph N recites, wherein one of the one or more processors is a specialized processing unit including one or more of: a graphics processing unit; or an integrated circuit; and wherein the specialized processing unit is configured to extract features from frames of a video or distribute the frames among locations in the counting grid.

P. A system as either paragraph N or O recites, wherein the tensor representation is a fixed-sized and wherein the fixed-size of the tensor representation is IV dimensions.

Q. A system as any one of paragraphs N-P recites, wherein the counting grid model is pre-trained on a corpus of video data and the counting grid model distributes same or similar frames of the video to a same or similar location in the counting grid.

R. A system as any one of paragraphs N-Q recites further comprising: a camera to obtain the video; and a display and wherein the operations further include: providing, by the interface and the one or more processors, to the display an abbreviated form of the video based at least in part on the tensor representation.

S. A method comprising: extracting features from a frame of a video; calculating a histogram representation of the features; assigning the frame of the video to a location within a counting grid based at least in part on the histogram and feature bags associated with locations in the counting grid; producing a feature representation of the video based at least in part on an aggregation of feature bags associated with locations in the counting grid to which frames of the video are assigned; and conducting one or more of: generating an abbreviated portion of the video based at least on the feature representation; or classifying an event associated with at least a portion of the video based at least in part on the feature representation.

T. A method as paragraph S recites, wherein producing the feature representation of the video includes: reducing or removing features attributable to redundant or insignificant frames of the video by: identifying the locations in the counting grid to which frames are assigned; and identifying a subset of the locations having greater than a threshold number of frames assigned thereto; and aggregating feature representations associated with the subset to obtain the feature representation of the video.

U. A system comprising: one or more processors; and computer-readable media having stored thereon computer-executable instructions, that, when executed, configure the system to perform operations comprising: the method as any one of paragraphs A-M, S, or T recites implemented as operations.

V. A device comprising: one or more processors; and computer-readable media having stored thereon computer-executable instructions, that, when executed, configure the system to perform operations comprising: the method as any one of paragraphs A-M, S, or T recites implemented as operations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or operations. Thus, such conditional language is not generally intended to imply that certain features, elements and/or operations are in any way required for one or more examples or that one or more examples necessarily include logic for deciding, with or without user input or prompting, whether certain features, elements and/or operations are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   receiving a tensor representation of at least a portion of a video, wherein the tensor representation is a fixed-sized;
   generating a counting grid map for the video, the counting grid map including feature bags associated with coordinates of the counting grid map;
   assigning frames of the video to coordinates of the counting grid map based at least in part on features detected from the frames;
   generating an active map from the counting grid map by conversion of a frequency distribution of the frames to a binary map, the active map including a subset of coordinates of the counting grid map to which frames are assigned, wherein the subset of coordinates of the active map includes coordinates of the counting grid map that have a number of frames above a threshold;

aggregating feature bags associated with the active map to obtain an aggregate feature bag, the aggregate feature bag including a representation of the video.

2. A method as claim 1 recites, further comprising:
training a counting grid model from a corpus of video data, the training including:
obtaining unique descriptors from the corpus of video data, the unique descriptors defining elements of the feature bags;
selecting a coordinate k within the counting grid model;
calculating, based at least in part on a window at the coordinate k of the counting grid, a distribution of the unique descriptors;
generating a feature bag at the coordinate k based at least in part on the distribution of the unique descriptors, the generation of the feature bag at the coordinate k comprising an association between the feature bag and the coordinate k; and
mapping frames of the corpus of video data to coordinates within the counting grid model based at least in part on similarity between descriptors associated with the frames and feature bags of the coordinates to which the frames are mapped, the mapping resulting in a location distribution of the frames in the counting grid model; and
wherein generating the counting grid map for the video includes generating the counting grid map for the video based at least in part on the counting grid model.

3. A method as claim 2 recites, wherein the elements of the feature bags correspond to descriptors identifying visual primitives.

4. A method as claim 2 recites, wherein training the counting grid model includes using an expectation-maximization ("EM") algorithm to estimate the counting grid model by maximizing a likelihood of a joint distribution over an index of the unique descriptors and latent window locations in the counting grid model.

5. A method as claim 2 recites, wherein generating the counting grid map from the counting grid model includes using an expectation-maximization ("EM") algorithm to generate the counting grid map where a maximization ("M") operation includes a prior based at least in part on the counting grid model.

6. A method as claim 5 recites, wherein the prior is a Dirichlet prior with parameters based at least in part on the counting grid model and weighted to adjust influence of the prior on generating the counting grid map for the video.

7. A method as claim 1 recites, wherein a feature bag of the feature bags includes a normalized probability distribution of frame descriptors.

8. A method as claim 1 recites, the generating the counting grid map for the video including:
mapping a frame of the video to a coordinate on the counting grid map based at least in part on an estimate that descriptors associated with the frame of the video comport with a feature bag associated with the coordinate.

9. A method as claim 1 recites, wherein conversion of a frequency distribution of the frames to a binary map includes:
calculating a frequency distribution of the frames assigned to coordinates of the counting grid map; and
converting the frequency distribution of the frames to the active map, the active map being the binary map having values denoting active coordinates and inactive coordinates of the counting grid map wherein a coordinate is an active coordinate when the coordinate has a number of frames assigned thereto that exceeds a threshold number of frames.

10. A method as claim 1 recites, wherein the aggregating feature bags includes one or more of:
sum-aggregating,
forming a fisher vector, or
forming a vector of locally aggregated descriptors to obtain the aggregated feature bag.

11. A method as claim 1 recites, further comprising
normalizing the aggregate feature bag; or
dimensionally reducing the aggregate feature bag.

12. A method as claim 11 recites further comprising:
conducting query expansion on the aggregate feature bag to obtain a global representation for the video, the global representation including video feature terms disparate from features terms associated with the counting grid; and
making the global representation for the video available for recognition or retrieval.

13. A method as claim 11 recites, wherein the method includes sequentially:
power normalizing the aggregate feature bag,
whitening the aggregate feature bag, and
re-power normalizing the aggregate feature bag.

14. A system comprising:
one or more processors;
an interface communicatively coupled with the one or more processors, the interface configured to:
receive a video,
provide the video to the one or more processors, and
receive a tensor representation of at least a portion of the video from the one or more processors, wherein the tensor representation is a fixed-sized;
the one or more processors configured to receive the video and perform operations comprising:
extracting features from frames of the video;
distributing, by a counting grid model, the frames among locations in a counting grid based at least in part on features of respective frames and features associated with locations in the counting grid;
generating an active map from the counting grid by conversion of a frequency distribution of the frames to a binary map, the active map including a subset of locations of the counting, wherein the subset of locations of the active map includes locations of the counting grid that have a number of frames above a threshold; and
identifying and removing redundant frames of the video based at least in part on the distribution of the frames within the active map to produce a tensor representation of the video.

15. A system as claim 14 recites, wherein one of the one or more processors is a specialized processing unit including one or more of:
a graphics processing unit; or
an integrated circuit; and
wherein the specialized processing unit is configured to extract features from frames of a video or distribute the frames among locations in the counting grid.

16. A system as claim 14 recites, wherein the fixed-size of the tensor representation is 256 dimensions.

17. A system as claim 14 recites, wherein the counting grid model is pre-trained on a corpus of video data and the counting grid model distributes same or similar frames of the video to a same or similar location in the counting grid.

18. A system as claim 14 recites further comprising:
a camera to obtain the video; and
a display and wherein the operations further include:
provide, by the interface and the one or more processors, to the display an abbreviated form of the video based at least in part on the tensor representation.

19. A method comprising:
receiving a tensor representation of at least a portion of a video, wherein the tensor representation is a fixed-sized;
extracting features from a frame of the video;
calculating a histogram representation of the features;
assigning the frame of the video to a location within a counting grid based at least in part on the histogram and feature bags associated with locations in the counting grid;
generating an active map from the counting grid by conversion of a frequency distribution of the frames to a binary map, the active map including a subset of locations of the counting grid, wherein the subset of locations of the active map includes locations of the counting grid that have a number of frames above a threshold;
producing a feature representation of the video based at least in part on an aggregation of feature bags associated with locations in the active map to which frames of the video are assigned; and
conducting one or more of:
generating an abbreviated portion of the video based at least on the feature representation; or
classifying an event associated with at least a portion of the video based at least in part on the feature representation.

20. A method as claim 19 recites, wherein producing the feature representation of the video includes:
reducing or removing features attributable to redundant or insignificant frames of the video by:
identifying the locations in the counting grid to which frames are assigned; and
aggregating feature representations associated with the subset of locations to obtain the feature representation of the video.

* * * * *